（12） United States Patent
Kitaji et al.

(10) Patent No.: US 10,180,711 B2
(45) Date of Patent: Jan. 15, 2019

(54) SEMICONDUCTOR DEVICE

(71) Applicant: Renesas Electronics Corporation, Tokyo (JP)

(72) Inventors: Yuko Kitaji, Kodaira (JP); Kazuki Fukuoka, Kodaira (JP); Ryo Mori, Kodaira (JP); Toshifumi Uemura, Kodaira (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 66 days.

(21) Appl. No.: 15/224,380

(22) Filed: Jul. 29, 2016

(65) Prior Publication Data
US 2017/0075404 A1 Mar. 16, 2017

(30) Foreign Application Priority Data

Sep. 16, 2015 (JP) .................................. 2015-182677

(51) Int. Cl.
*G06F 1/30* (2006.01)
*G06F 1/32* (2006.01)
*G06F 1/10* (2006.01)

(52) U.S. Cl.
CPC ............... *G06F 1/305* (2013.01); *G06F 1/10* (2013.01); *G06F 1/32* (2013.01); *G06F 1/3237* (2013.01)

(58) Field of Classification Search
CPC ....................................................... G06F 1/32
See application file for complete search history.

(56) References Cited

U.S. PATENT DOCUMENTS

| 5,847,555 | A | * | 12/1998 | Lewis | ................. | H02M 5/2573 |
| | | | | | | 323/235 |
| 6,760,625 | B1 | * | 7/2004 | Kroll | .................... | A61N 1/3708 |
| | | | | | | 607/29 |
| 9,141,177 | B1 | * | 9/2015 | Nicholls | ................. | G11C 5/147 |
| 2011/0291630 | A1 | * | 12/2011 | Konstadinidis | ....... | H02M 3/157 |
| | | | | | | 323/283 |
| 2017/0005665 | A1 | * | 1/2017 | Swaminathan | ......... | H03L 7/099 |

FOREIGN PATENT DOCUMENTS

JP 2014-052969 A 3/2014

OTHER PUBLICATIONS

Comparison of Intel Processors, Wikipedia, published Aug. 30, 2014, https://en.wikipedia.org/w/index.php?title=Comparison_of_Intel_processors&oldid=623395907.*

* cited by examiner

*Primary Examiner* — Paul Yen
*Assistant Examiner* — Kevin M Stewart
(74) *Attorney, Agent, or Firm* — McGinn IP Law Group, PLLC

(57) ABSTRACT

There is provided a semiconductor device that can follow a fast voltage change such as a large voltage drop occurring at the time of rapid load fluctuation. The semiconductor device includes a voltage sensor which monitors a power supply voltage at a sampling speed higher than the assumed frequency of power supply voltage fluctuation and outputs a voltage code value, a voltage drop determination circuit which determines, from the voltage code value, that a voltage drop causing a malfunction of a system occurs, and outputs a clock stop signal, and a clock control circuit which controls clock stop, restart, and frequency change.

7 Claims, 36 Drawing Sheets

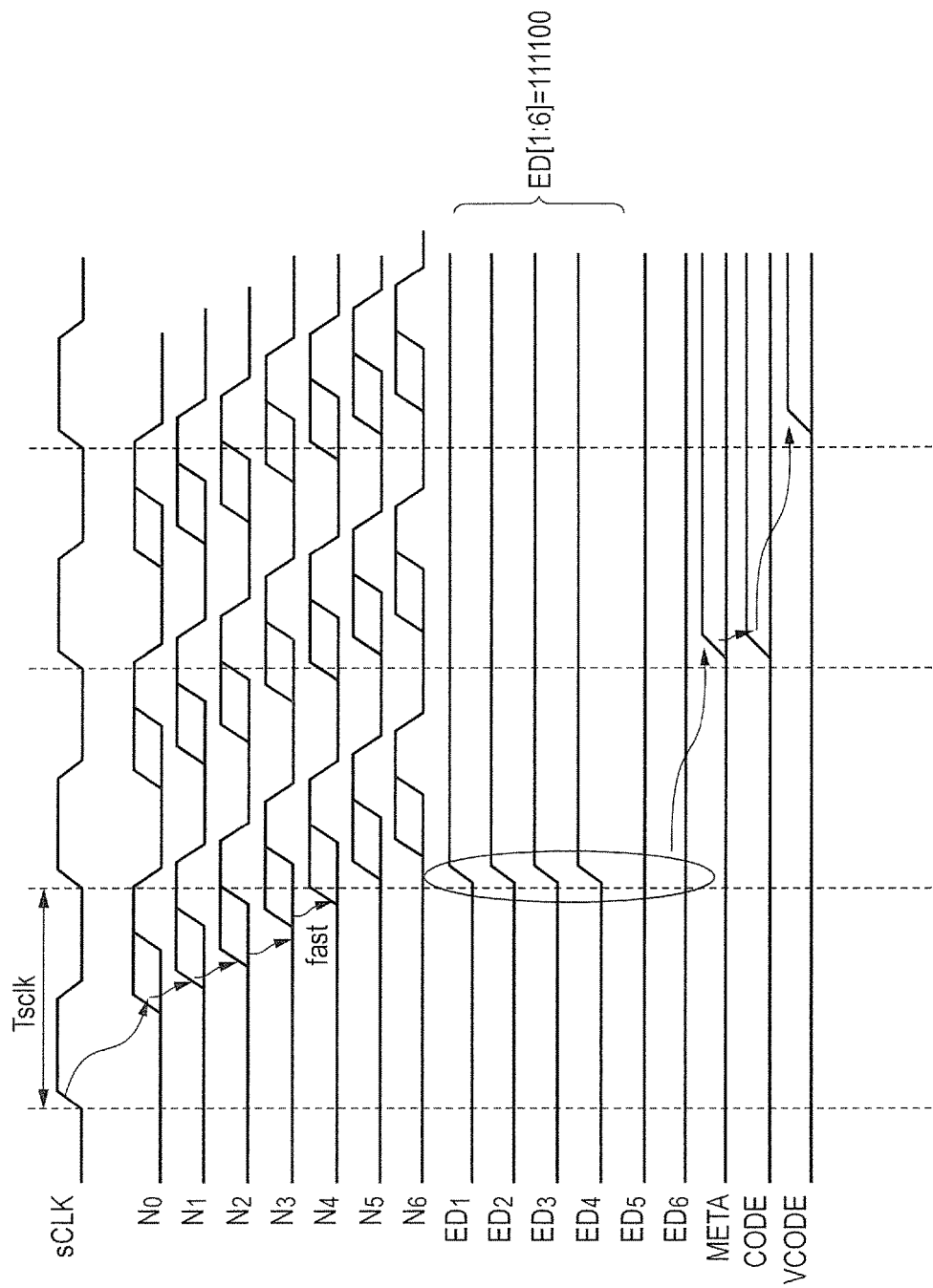

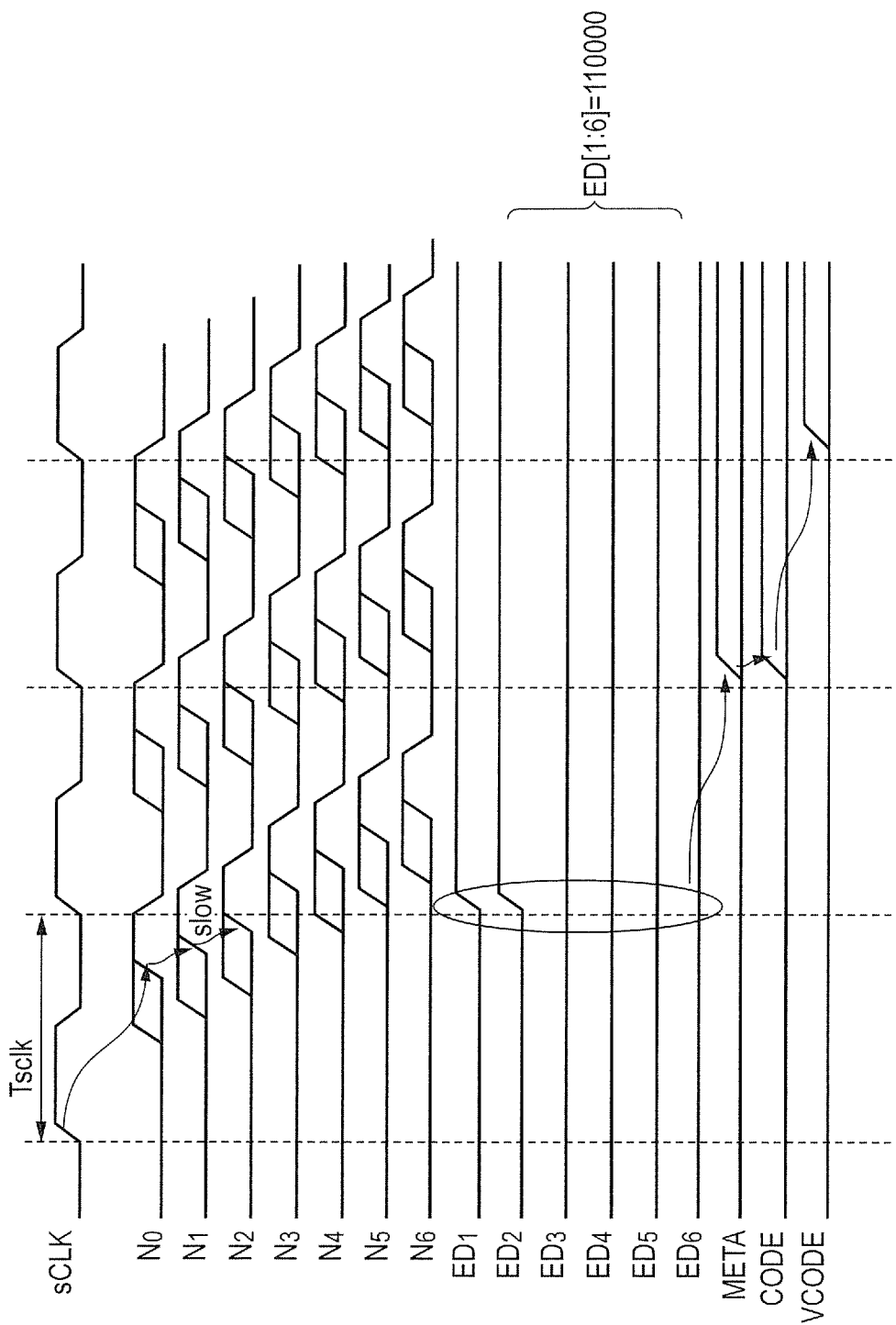

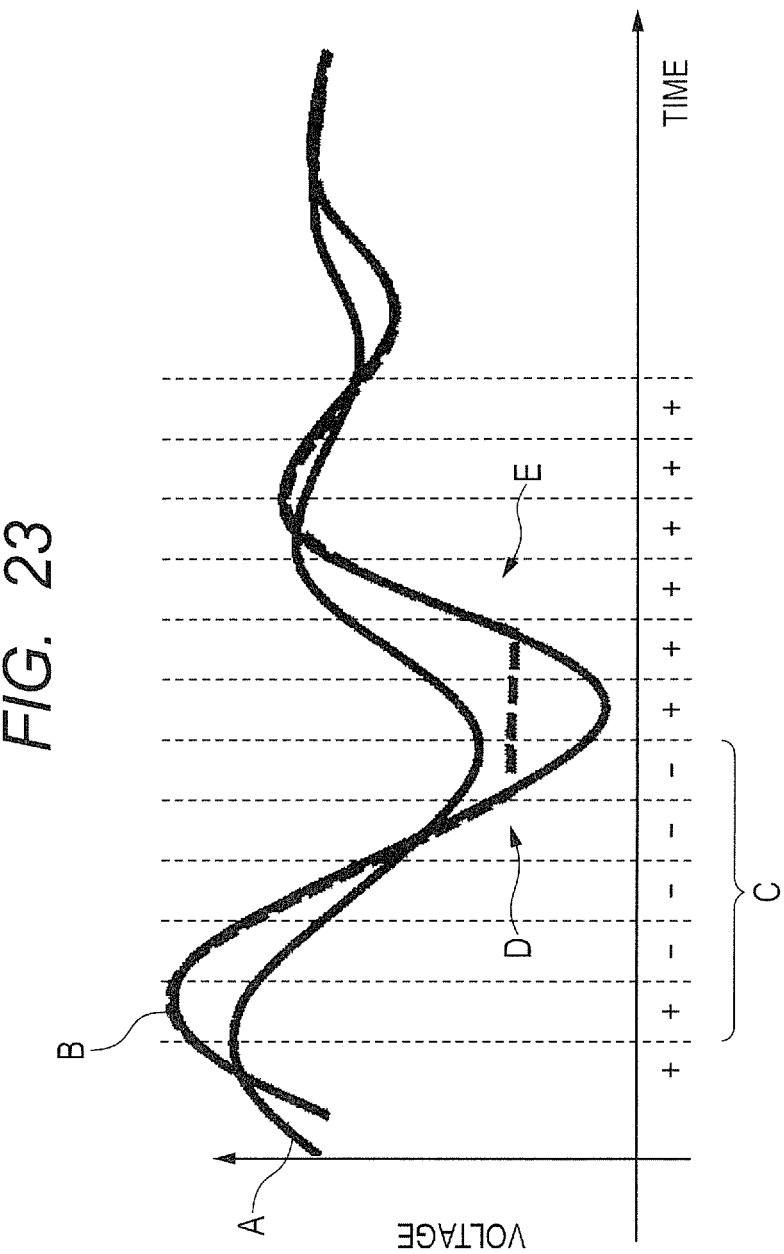

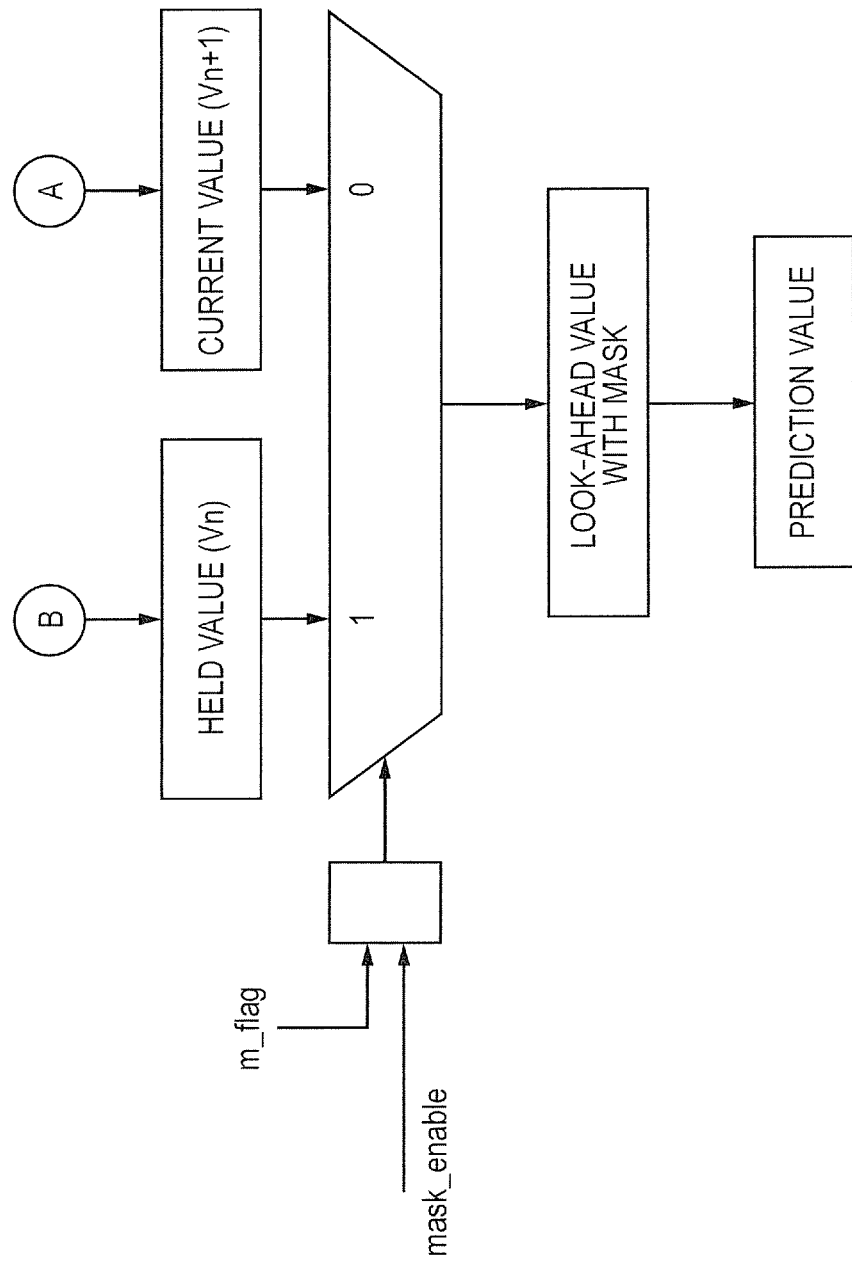

SEMICONDUCTOR DEVICE

CROSS-REFERENCE TO RELATED APPLICATIONS

The disclosure of Japanese Patent Application No. 2015-182677 filed on Sep. 16, 2015 including the specification, drawings and abstract is incorporated herein by reference in its entirety.

BACKGROUND

The present disclosure relates to a semiconductor device, and is particularly applicable to a semiconductor device including a circuit for sensing a voltage drop.

There is proposed a method of changing a clock frequency in accordance with power supply voltage fluctuation (e.g., Japanese Unexamined Patent Publication No. 2014-52969 (Patent Document 1)). That is, in the control, as the power supply voltage varies to be higher, the clock frequency is increased, thereby increasing an operation speed. On the other hand, as the power supply voltage varies to be lower, the clock frequency is decreased, thereby decreasing the operation speed.

SUMMARY

However, in the method of changing the clock frequency in accordance with power supply voltage fluctuation, due to latency required to change the clock frequency, it is not possible to follow a fast voltage change such as a large voltage drop occurring at the time of rapid load fluctuation.

The other problems and novel features will become apparent from the description of this specification and the accompanying drawings.

A typical aspect of the present disclosure will be briefly described as follows.

That is, a semiconductor device monitors a power supply voltage at a sampling speed higher than the assumed frequency of power supply voltage fluctuation, and stops a clock upon determining that a voltage drop causing a malfunction of a system occurs.

According to the above-described semiconductor device, it is possible to follow a fast voltage change such as a large voltage drop occurring at the time of rapid load fluctuation.

BRIEF DESCRIPTION OF THE DRAWINGS

FIG. 12A is an operation waveform diagram, at a high voltage, of the voltage sensor in FIG. 7.

FIG. 12B is an operation waveform diagram, at a low voltage, of the voltage sensor in FIG. 7.

FIG. 23 is a voltage waveform image diagram for explaining a mask function.

FIG. 24B is a flow diagram of the prediction computation with the mask function.

DETAILED DESCRIPTION

Figure 1:
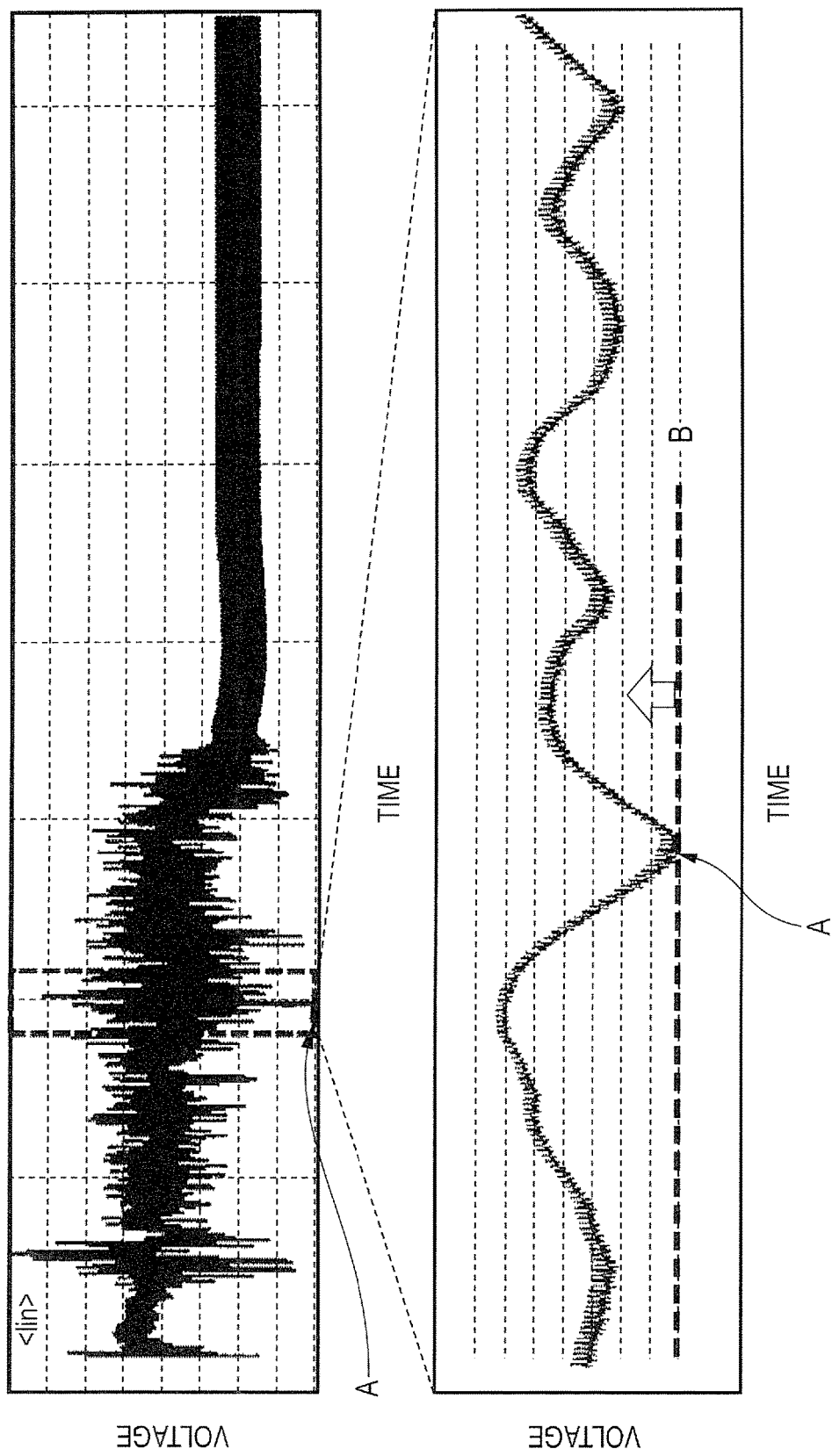
FIG. 1 is a diagram for explaining the relationship between a voltage drop occurring at the time of rapid load fluctuation and a design voltage range in a semiconductor device according to a comparison example 1.

Hereinafter, embodiments will be described with reference to the drawings. In the following description, the same components are denoted by the same reference numerals, and their repetitive description might be omitted.

First, techniques (hereinafter referred to as comparison examples) which the present inventors have examined prior to the present disclosure will be described.

FIG. 1 is a timing diagram showing the relationship between a voltage drop occurring at the time of rapid load fluctuation and a design voltage range in a semiconductor device according to a comparison example 1. An arrow A indicates a fatal voltage drop occurring due to rapid load fluctuation. In the comparison example 1, by performing design in the worst voltage range (broken line B) in anticipation of the large voltage drop occurring at the time of rapid load fluctuation, an actual operation is ensured. The design in the wide voltage range that ensures the worst rapid load fluctuation greatly decreases the maximum operation speed, which makes it difficult to achieve desired computational performance. Further, if a larger voltage drop than assumed in the design occurs in an actual operation, a malfunction occurs.

Figure 2:
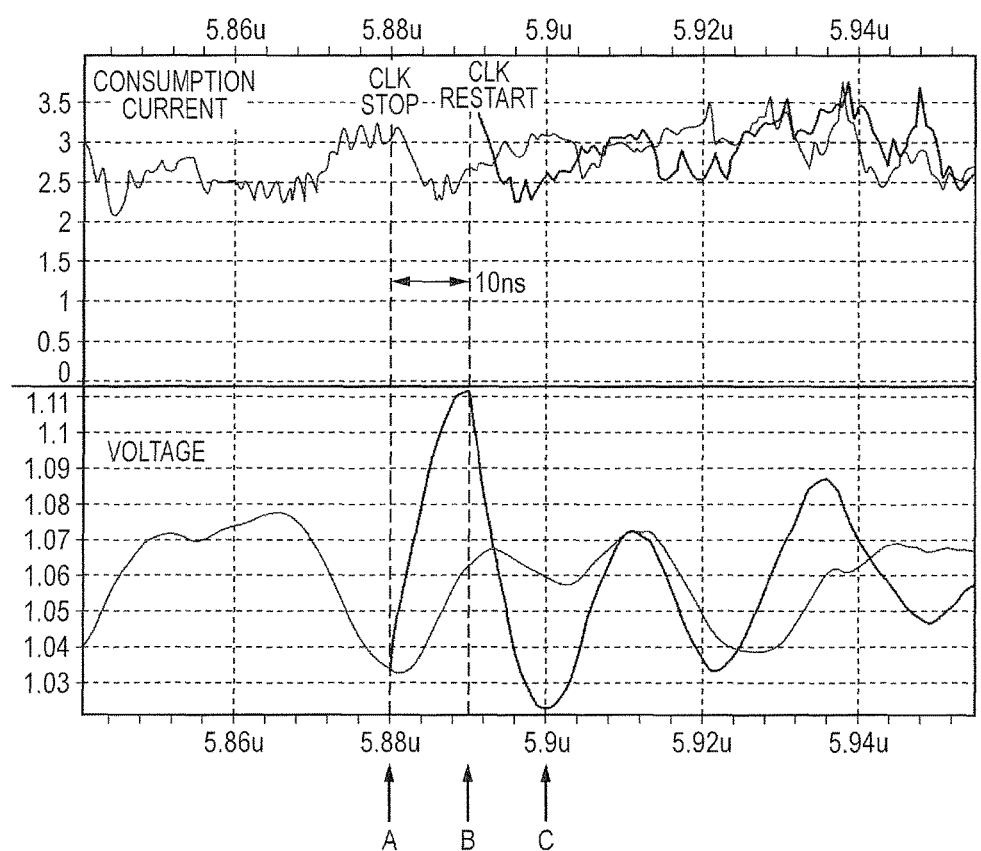
FIG. 2 is a diagram showing a simulation result of the voltage and current of a semiconductor device according to a comparison example 2.

FIG. 2 is a diagram showing a simulation result of the voltage and current of a semiconductor device according to a comparison example 2. In the comparison example 2, a clock is stopped to prevent a malfunction caused by a voltage drop. However, in the case of restarting the clock immediately after the stop, rapid current change due to the supply of the clock might cause a further voltage drop; therefore, control in which the clock is simply stopped and restarted does not cope with the fatal voltage drop occurring at the time of rapid load fluctuation. For example, as shown in FIG. 2, in the case where the clock is restarted (B) after a lapse of 10 ns from the clock stop (A), the voltage drops rapidly (C) and becomes worse than before the clock stop.

Figure 3:
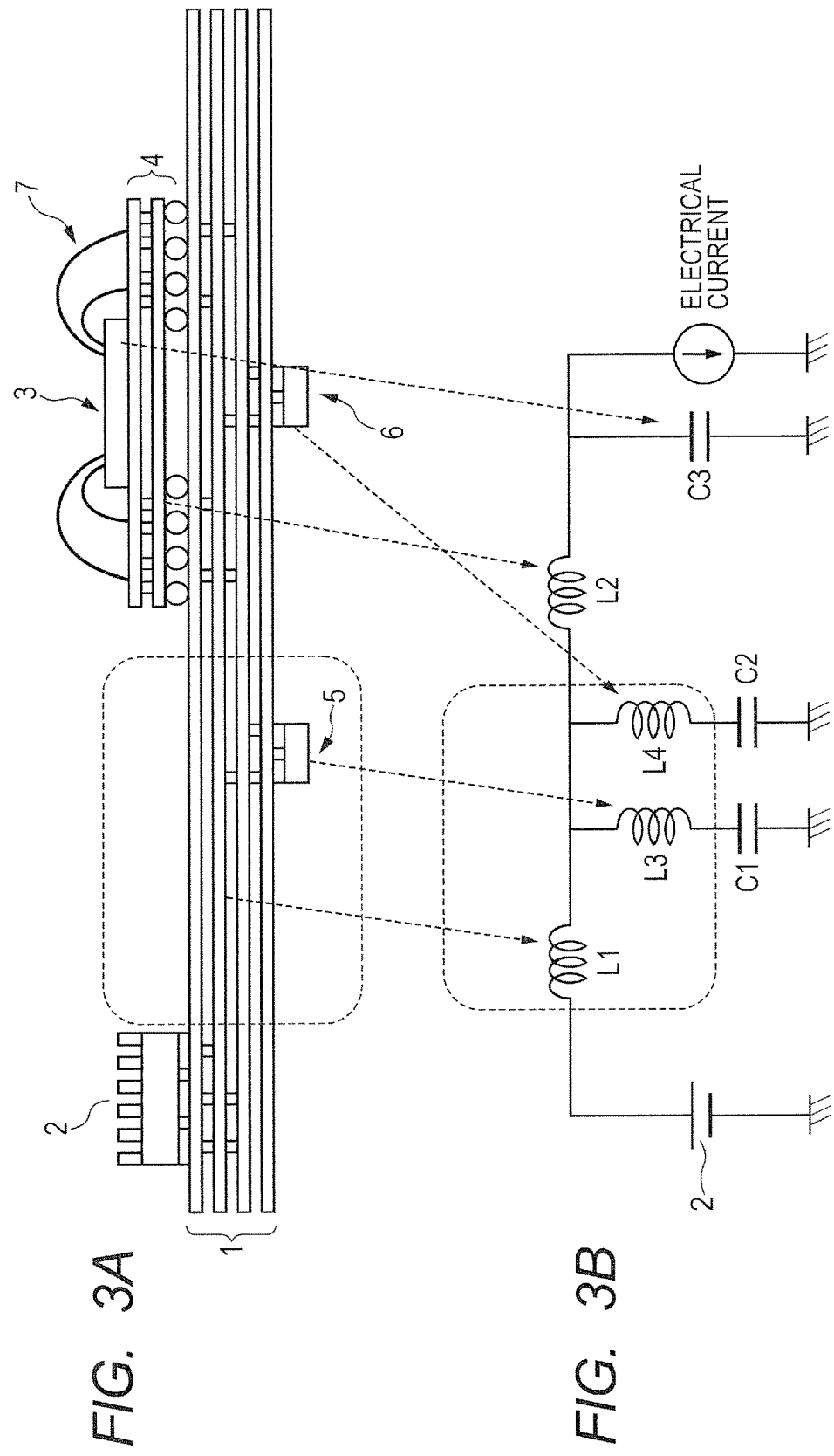
FIGS. 3A and 3B are drawings for explaining the vibration of a power supply voltage in a board mounting a semiconductor chip.

FIGS. 3A and 3B are drawings for explaining the vibration of a power supply voltage in a board mounting a semiconductor chip, in which FIG. 3A is a sectional diagram, and FIG. 3B is an equivalent circuit diagram. A voltage regulator 2, a package 4 mounted with a semiconductor chip 3, and decoupling capacitors 5, 6 are mounted on a board 1. The semiconductor chip 3 is electrically coupled to terminals of the package 4 through bonding wires 7. An inductor L1 is a power distribution network on the board, an inductor L2 is a power distribution network on the package, and inductors L3, L4 are the equivalent inductances of the decoupling capacitors 5, 6. Capacitors C1, C2 are the capacitances of the decoupling capacitors 5, 6. A capacitor C3 is the capacitance of a decoupling capacitor on the semiconductor chip.

The amplitude (=impedance) and resonance frequency of the AC vibration waveform of the power supply voltage are determined from the inductances (L), capacitances (C), and resistances (R) of the semiconductor chip 3, the package 4, and the board 1.

Figure 4:
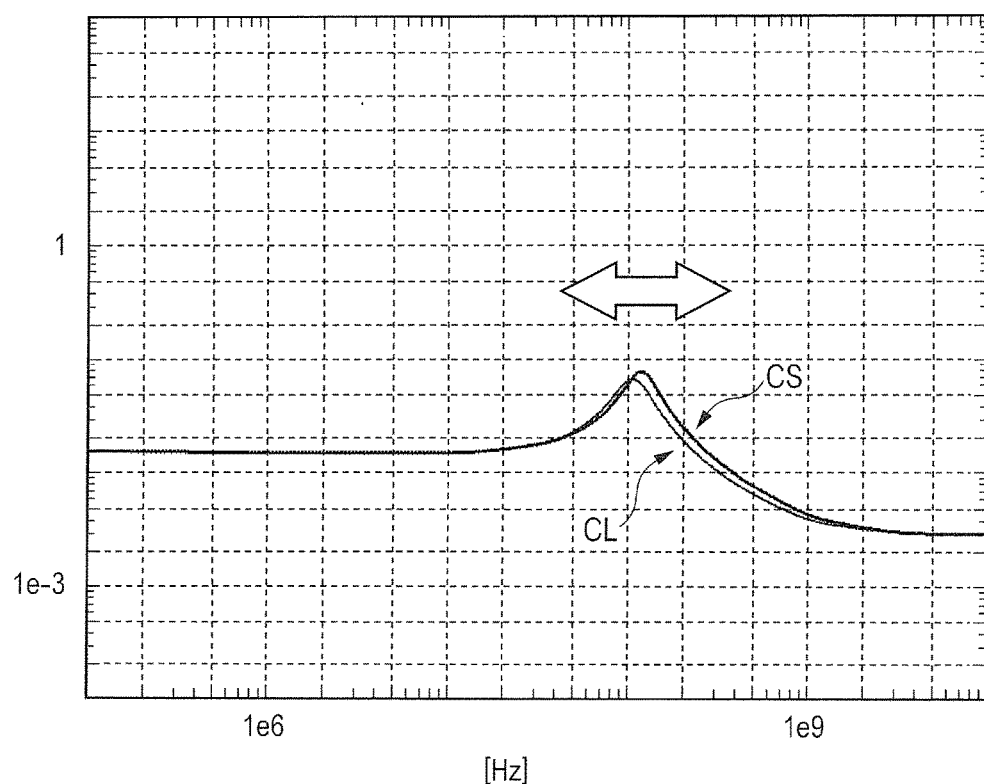
FIG. 4 is a diagram for explaining the relationship between a frequency and a power supply impedance for each chip capacitance.
Figure 5:
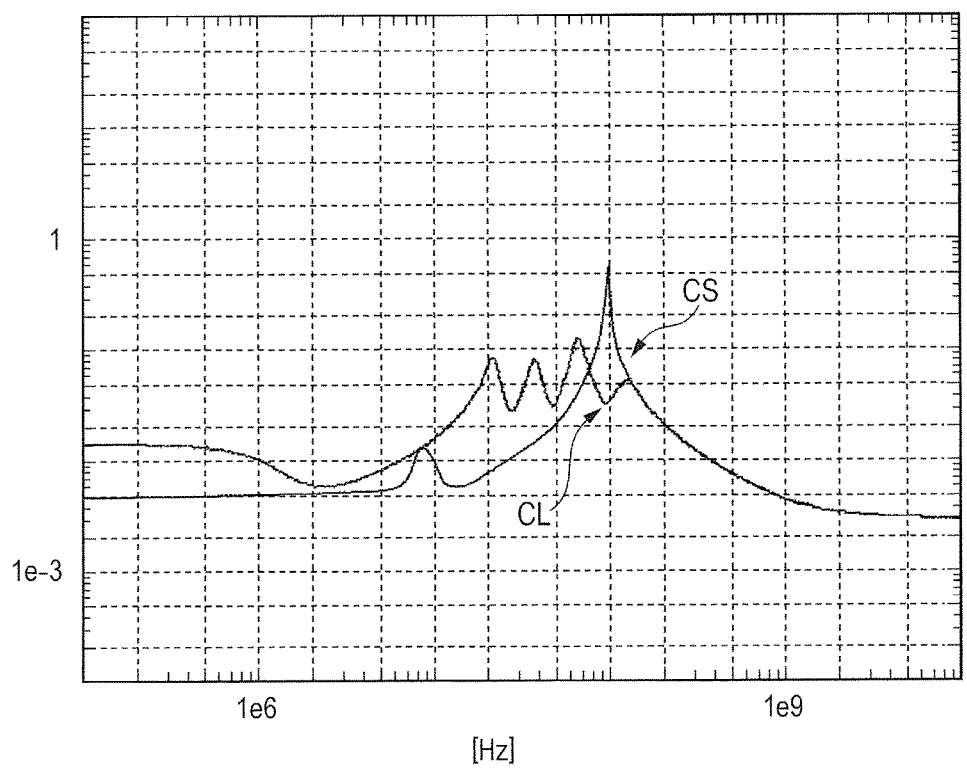
FIG. 5 is a diagram for explaining the relationship between a frequency and a power supply impedance for each board capacitance.

FIG. 4 is a diagram showing the relationship between a frequency and a power supply impedance for each chip capacitance. FIG. 5 is a diagram showing the relationship between a frequency and a power supply impedance for each board capacitance.

Since the power supply impedance determines the amplitude of the power supply voltage waveform, the suppression of the power supply impedance leads to the suppression of the power supply voltage drop. As shown in FIGS. 4 and 5, frequency characteristics of the power supply impedance differ between a large capacitance CL and a small capacitance CS. In other words, the power supply impedance has different frequency characteristics depending on the on-chip capacitance and the board capacitance. Different mounting capacitances, parasitic capacitances, etc. (L, C, R components) between customer boards lead to different frequency characteristics of the power supply impedance. Therefore, it is necessary to optimally determine the power supply voltage drop in accordance with the power supply impedance.

Embodiment

Figure 31:
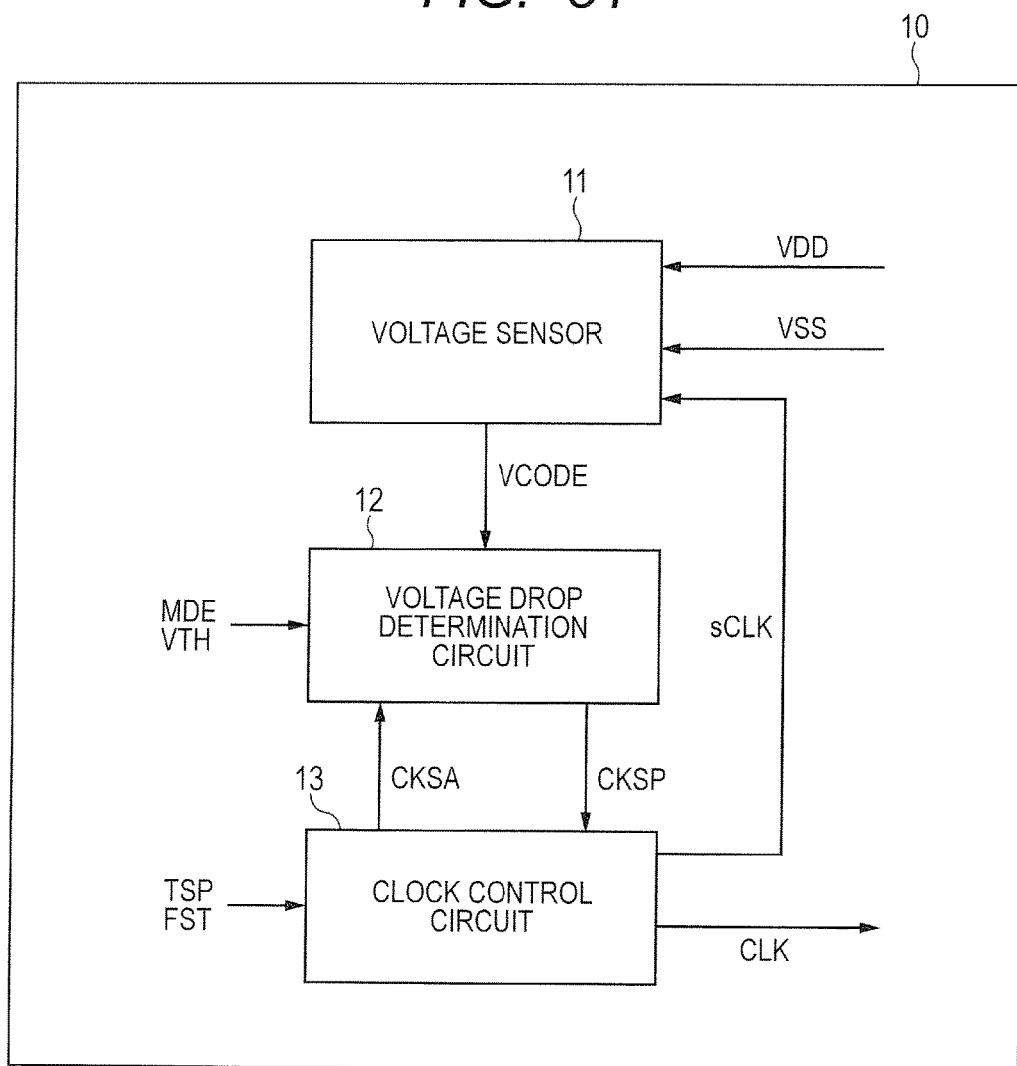
FIG. 31 is a block diagram showing the configuration of the semiconductor device according to the embodiment.

FIG. 31 is a block diagram showing the configuration of a semiconductor device according to an embodiment. The semiconductor device 10 according to the embodiment includes a voltage sensor 11 which monitors the power supply voltage at a sampling speed higher than the assumed frequency of power supply voltage fluctuation and outputs a voltage code value, a voltage drop determination circuit 12 which determines, from the voltage code value, that a voltage drop causing a malfunction of the system occurs, and outputs a clock stop signal, and a clock control circuit 13 which controls clock stop, restart, and frequency change.

Figure 6:
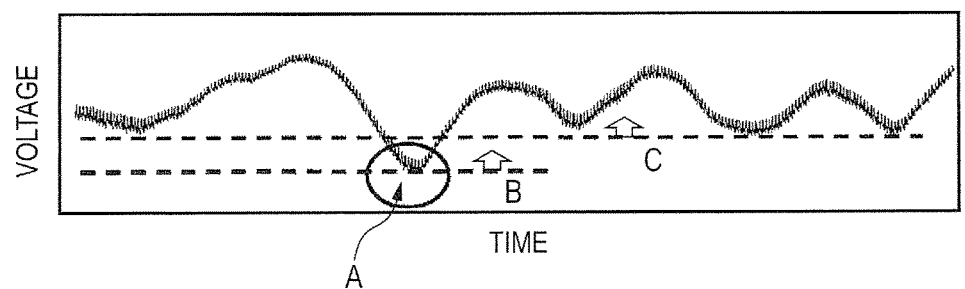
FIG. 6 is a voltage waveform diagram for explaining the effect of a semiconductor device according to an embodiment.

According to the embodiment, it is possible to suppress the system malfunction that might occur at the occurrence of rapid load fluctuation exceeding the design voltage range. FIG. 6 is a voltage waveform diagram for explaining the effect of the semiconductor device according to the embodiment. The arrow A indicates the voltage drop that rarely occurs, and the design voltage range is set to be above the broken line B, in the comparison example 1. In the embodiment, the design voltage range can be set to be above a broken line C. That is, the fatal voltage drop due to the worst rapid load fluctuation is excluded from the design voltage range, which enables the design of a narrower voltage range, thereby making it possible to improve the maximum operation frequency and the computational performance.

First Embodiment

Figure 7:
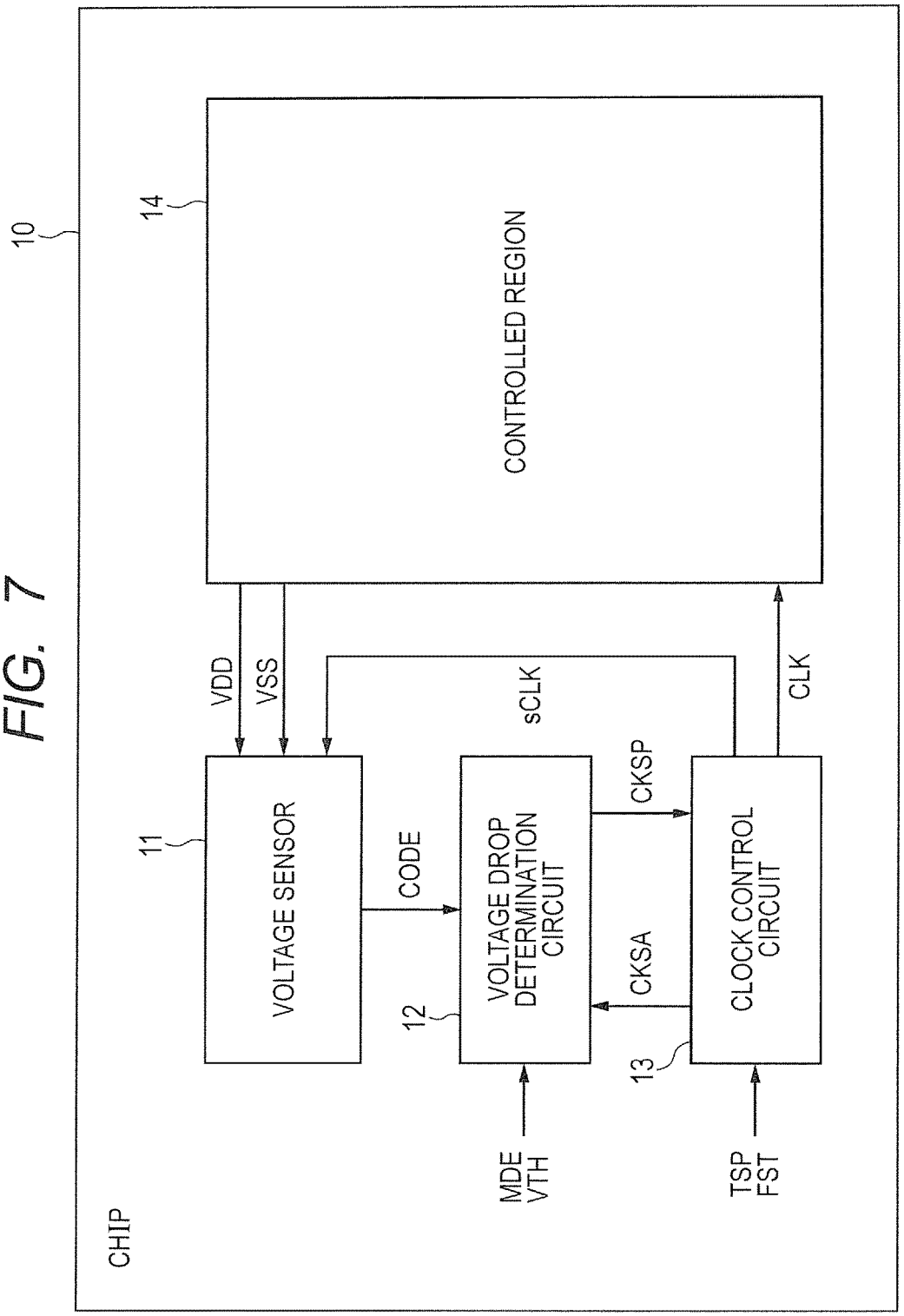
FIG. 7 is a block diagram for explaining the configuration of a semiconductor device according to a first embodiment.

FIG. 7 is a block diagram showing the configuration of a semiconductor device according to a first embodiment. The semiconductor device (CHIP) 10 according to the first embodiment includes the voltage sensor 11, the voltage drop determination circuit 12, the clock control circuit 13, and a controlled region 14 over one semiconductor substrate. The voltage sensor 11 monitors the power supply voltage (VDD) with the sampling speed higher than the frequency of power supply voltage fluctuation, and outputs a voltage code value. With respect to a calculation algorithm and a threshold set by registers, if a result calculated from the voltage code value falls below the threshold, the voltage drop determination circuit 12 determines that a fatal voltage drop occurs, and generates a clock stop signal (CKSP). On the contrary, to detect the occurrence of an excessive voltage rise, a threshold for determining a voltage upper limit may be set so that the clock stop signal (CKSP) is generated if the result exceeds the threshold. The clock control circuit 13 supplies a clock signal (CLK) to the controlled region 14, and restarts the clock signal (CLK) in a stepwise manner after waiting for a predetermined time set by a circuit for stopping the clock signal (CLK) in response to the clock stop signal (CKSP) and a register. Determination mode selection (computation algorithm selection (MDE), determination threshold (VTH)) and clock restart mode selection (clock stop period (TSP), clock restart step value (FST)) are set to registers in the voltage drop determination circuit 12 and the clock control circuit 13 by a CPU in the controlled region 14 or a device outside the semiconductor device 10.

Figure 8:
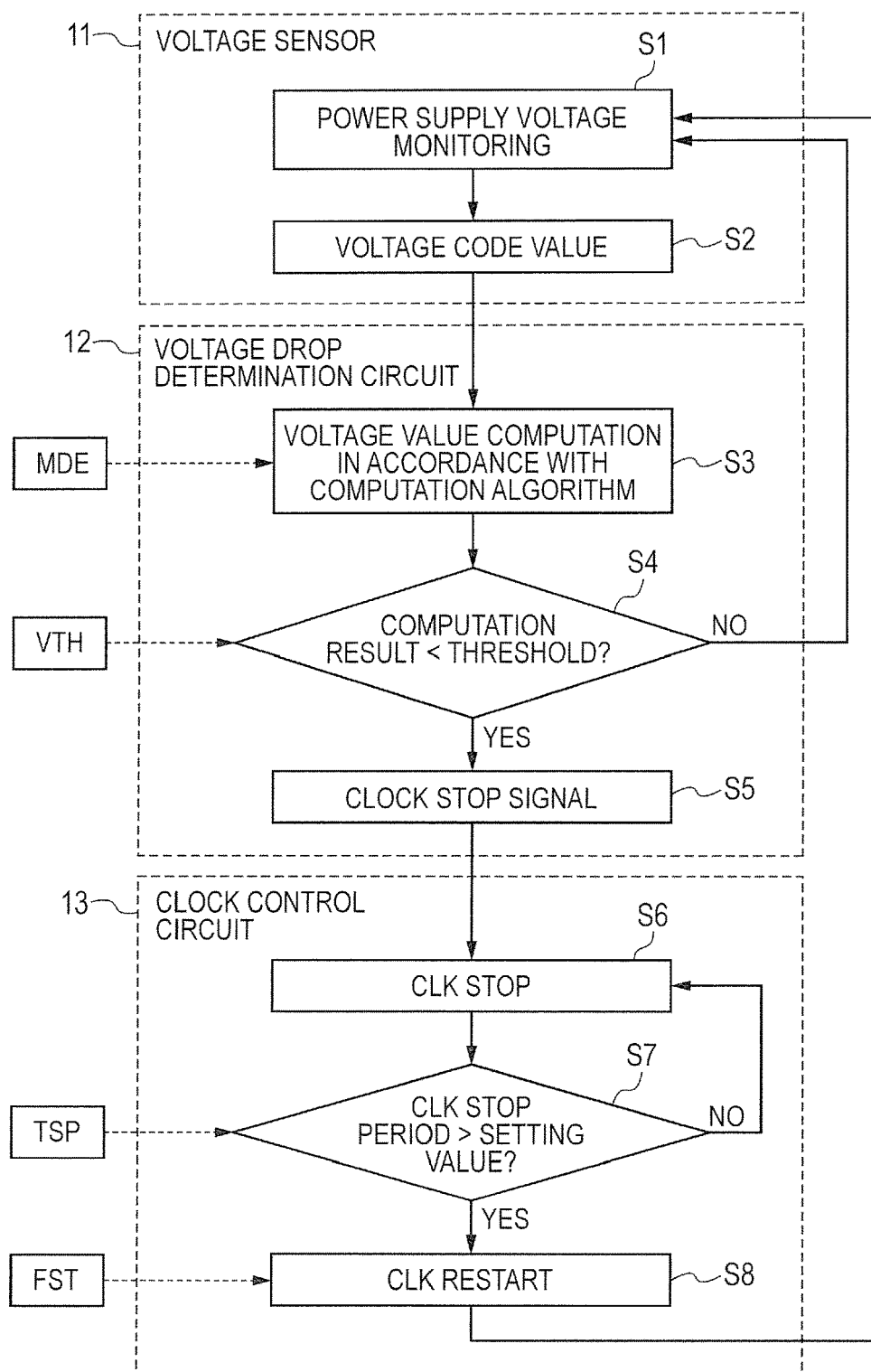
FIG. 8 is a control flow diagram of the semiconductor device of FIG. 7.

FIG. 8 is a control flow diagram of the semiconductor device of FIG. 7.

Step S1: The voltage sensor 11 monitors the power supply voltage. It is desirable that the voltage sampling speed be more than 20 times the assumed voltage fluctuation frequency. For example, if the voltage vibrates at 50 MHz, the sampling speed is 1 GHz or higher. In addition, it is desirable that the sampling speed be equal to or 1/n of the frequency of the clock signal (CLK) which is the cause of voltage fluctuation. If sampling is performed at a cycle faster than the clock frequency, voltage fluctuation in a clock cycle that is not the cause of the malfunction is captured, which leads to the pessimistic determination of the voltage drop.

Step S2: The voltage sensor 11 converts the monitored power supply voltage into a voltage code value and outputs it.

Step S3: The voltage drop determination circuit 12 performs a voltage value computation in accordance with the computation algorithm (MDE) which the CPU or the like in the controlled region 14 sets with the register value. The computation algorithm for determining voltage drop occurrence enables various computations for determining voltage drop occurrence such as an absolute value computation, an average value computation, a variation value calculation, and a prediction calculation.

Figure 9:
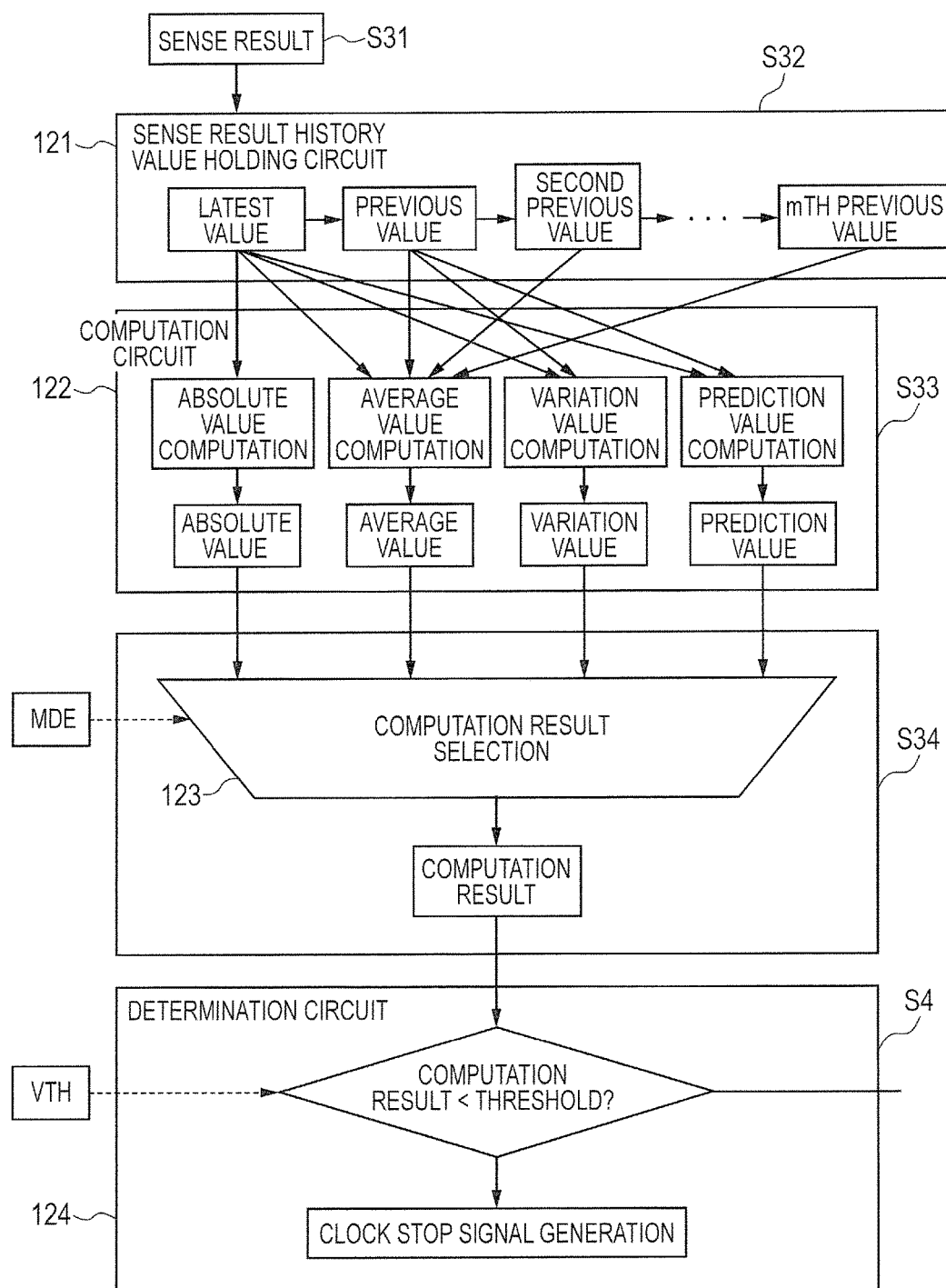
FIG. 9 is a flow diagram of a voltage drop determination circuit in FIG. 7.

FIG. 9 is a diagram showing a voltage drop occurrence determination flow.

Step S31: The voltage code value as a sense result is acquired.

Step S32: A sense result history holding circuit 121 holds the latest value of the sense result, the previous value, the second previous value, . . . , the mth previous value.

Step S33: A computation circuit 122 performs an absolute value computation, an average value computation, a variation value computation, and a prediction value computation, using the sense result of the sense result history holding circuit, thereby obtaining an absolute value, an average value, a variation value, and a prediction value.

Step S34: A computation result selection circuit 123 selects, as a computation result, one of the absolute value, the average value, the variation value, and the prediction value, based on the determination mode selection value (MDE) in the register. Only the computation circuit selected based on the determination mode selection value (MDE) may be operated. The computation circuit 122 does not need to have all of the absolute value, the average value, the variation value, and the prediction value, but may have at least two values in the case of having a plurality of values. Further, the computation circuit 122 does not need to include a plurality of computation circuits, but may have at least one of the absolute value, the average value, the variation value, and the prediction value.

Step S4: A determination circuit 124 compares the computation result with the determination threshold (VTH) set by the register value (computation result<threshold). If YES, the flow moves to step S5. If NO, the flow returns to step S1 to continue monitoring the voltage. On the contrary, for example, to protect the semiconductor device 10 from an excessive voltage rise, a comparison in which computation result>threshold may be performed.

Step S5: The voltage drop determination circuit 12 outputs the clock stop signal (CKSP).

Step S6: The clock control circuit 13 stops clock supply, based on the clock stop signal (CKSP) (CLK stop).

Step S7: The clock control circuit 13 compares a period after the clock supply stop with the clock stop period (TSP) set by the register value (CLK stop period>setting value). If YES, the flow moves to step S8. If NO, the flow returns to step S6.

Step S8: The clock control circuit 13 restarts the clock after the clock stop for the predetermined time from the reception of the clock stop signal (CKSP), and increases the frequency in a stepwise manner, based on the clock restart step value (FST) set by the register value (CLK restart).

Figure 10:
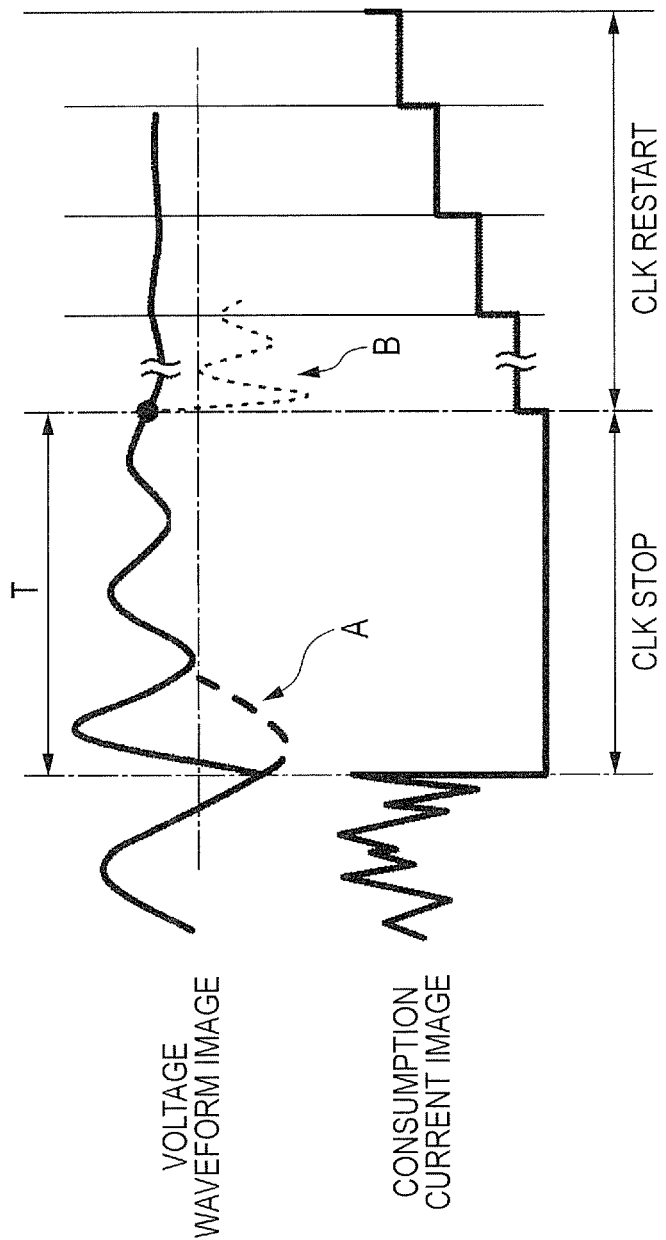
FIG. 10 is a voltage and current waveform image diagram during clock stop/restart.

FIG. 10 is a voltage and current waveform image diagram during clock stop/restart. In the clock stop and restart, the control of the period of a clock stop for a convergence time (T) of voltage vibration due to load fluctuation and a stepwise clock restart suppress a large voltage drop in the clock restart. When the clock is stopped, the voltage vibrates due to load fluctuation. For a period until the voltage vibration converges (the voltage fluctuation stabilizes), the clock is stopped. The clock stop (CLK stop) period is, e.g., 200 ns. A broken line A indicates a voltage waveform in the case where the clock is not stopped. In the clock restart (CLK restart), the clock frequency is increased in a stepwise manner. If the clock frequency is not increased in a stepwise manner at the time of the clock restart, a rapid voltage drop occurs due to current fluctuation, as shown by a dotted line B.

By applying the voltage sensor which samples at a high speed more than 20 times the voltage fluctuation frequency, it is possible to determine a voltage drop before the voltage drop causes a malfunction, and to stop the clock. Further, it is possible to look ahead the voltage drop from the envelope of the voltage drop.

By setting the clock stop period as the register setting value, it is possible to stop the clock until the voltage fluctuation at the time of the clock stop stabilizes.

By increasing the frequency in a stepwise manner at the time of the clock restart, it is possible to prevent a malfunction caused by the rapid voltage drop due to current fluctuation at the time of the clock restart.

By setting the voltage drop determination algorithm and the determination threshold to registers, it is possible to determine the voltage in accordance with the impedance determined by the power supply in the chip, the package, the PCB, and the like.

<Voltage Sensor>

Figure 11:
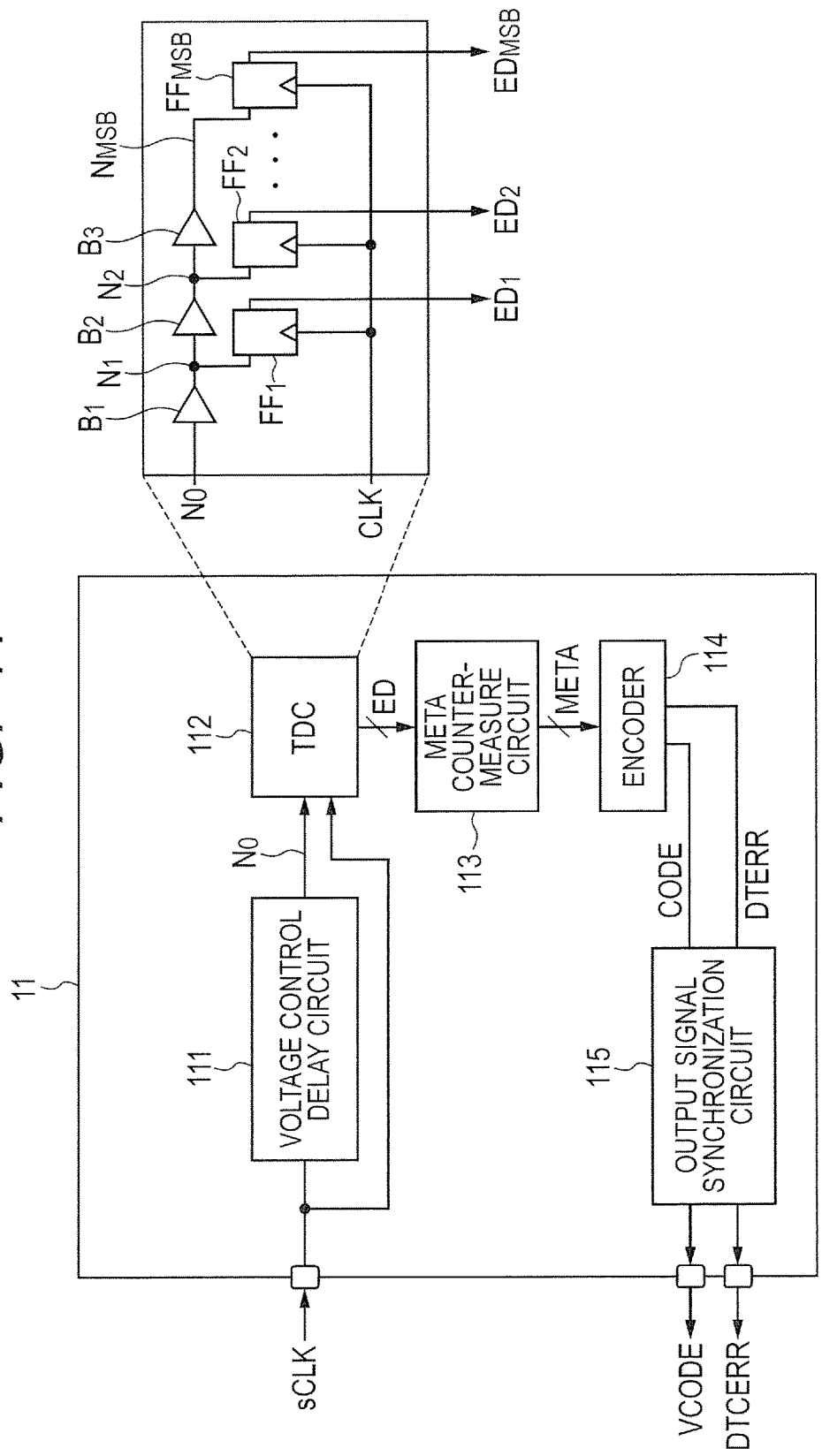
FIG. 11 is a block diagram for explaining the configuration of a voltage sensor in FIG. 7.

FIG. 11 is a block diagram showing the configuration of the voltage sensor in FIG. 7. The voltage sensor 11 is comprised of a voltage control delay circuit 111 for generating a delay value according to the voltage, a TDC (Time to Digital Converter) circuit 112 using D flip-flops, a META countermeasure circuit 113 for preventing metastable propagation, an encoder 114 for encoding a TDC result, and an output signal synchronization circuit 115 for synchronously outputting an encoded result.

FIGS. 12A and 12B are diagrams showing operation waveforms of the voltage sensor. FIG. 12A shows waveforms at a high voltage, and FIG. 12B shows waveforms at a low voltage. FIGS. 12A and 12B show an example of the 6-bit TDC circuit 112.

The pulse of a clock signal (sCLK) is inputted to the voltage control delay circuit 111, and reaches the TDC circuit 112 after a delay according to the power supply voltage. The voltage control delay circuit 111 is comprised of, for example, a buffer chain. The buffer chain is comprised of a plurality of unit delay elements (buffer cells) coupled in multiple stages, for example, a plurality of inverters. In general characteristics, the delay of the buffer cell varies in accordance with the power supply voltage, and is larger at the low power supply voltage than at the high power supply voltage.

The TDC circuit 112 is comprised of a buffer chain and D flip-flops. The pulse propagates with a delay by the delay time of buffer cells B1, B2, . . . , B6 between nodes $N_1$, $N_2$, . . . , $N_6$ respectively in the TDC circuit 112, and the delay value varies in accordance with the power supply voltage. Since the delay is smaller at the high voltage than at the low voltage, the pulse propagates faster to the subsequent stage of the buffer chain at the high voltage. By the nodes $N_1, N_2, \ldots, N_6$, the output of the D flip-flop to which a node signal that is sampled by the clock signal (sCLK) and is "1" at the next rising edge of sCLK is inputted transitions to "1". At the rising edge of sCLK, in the case of the high voltage, the nodes $N_1, N_2, \ldots, N_4$ are at "1", and the nodes $N_5$, $N_6$ are at "0"; accordingly, the output signals ($ED_1$, $ED_2, \ldots, ED_4$) of D flip-flops FF1, FF2, . . . , FF4 are "1", and the output signals ($ED_5$, $ED_6$) of D flip-flops FF5, FF6 are "0". On the other hand, in the case of the low voltage, at the rising edge of sCLK, the nodes $N_1$, $N_2$ are at "1", and the nodes $N_3, N_4, \ldots, N_6$ are at "0"; accordingly, $ED_1$, $ED_2$ are "1", and $ED_3, ED_4, \ldots, ED_6$ are "0". ED is comprised of the continuous value of "1" and the continuous value of "0". The boundary of "10" of ED appears on a higher bit side with a higher power supply voltage, and appears on a lower bit side with a lower power supply voltage. As shown in FIG. 12A, ED[1:6]=111100 at the high voltage, whereas ED[1:6]=110000 at the low voltage as shown in FIG. 12B. Thus, the boundary of "10" appears on the higher bit side with the higher voltage, and appears on the lower bit side with the lower voltage.

The META countermeasure circuit 113 captures the ED value at the next rising edge of sCLK after the transition of ED, and outputs it as a signal (META). META has the same number of bits as ED. The encoder 114 performs encoding based on the boundary position of "10" of META bits, and outputs voltage code (CODE). The output signal synchronization circuit 115 receives the voltage code (CODE), and outputs voltage code (VCODE) in synchronization with sCLK.

In the TDC circuit 112 in FIG. 11, there is a case of different results between the first sampling and the second and subsequent samplings in spite of the sampling of the same voltage, depending on the relationship between the period of the clock signal (sCLK) and the delay value of the voltage control delay circuit 111 and the TDC circuit 112. In this case, there is no one-to-one relationship between the voltage value and the sampling value, which makes it difficult for the encoder 114 to perform encoding.

Figure 13:
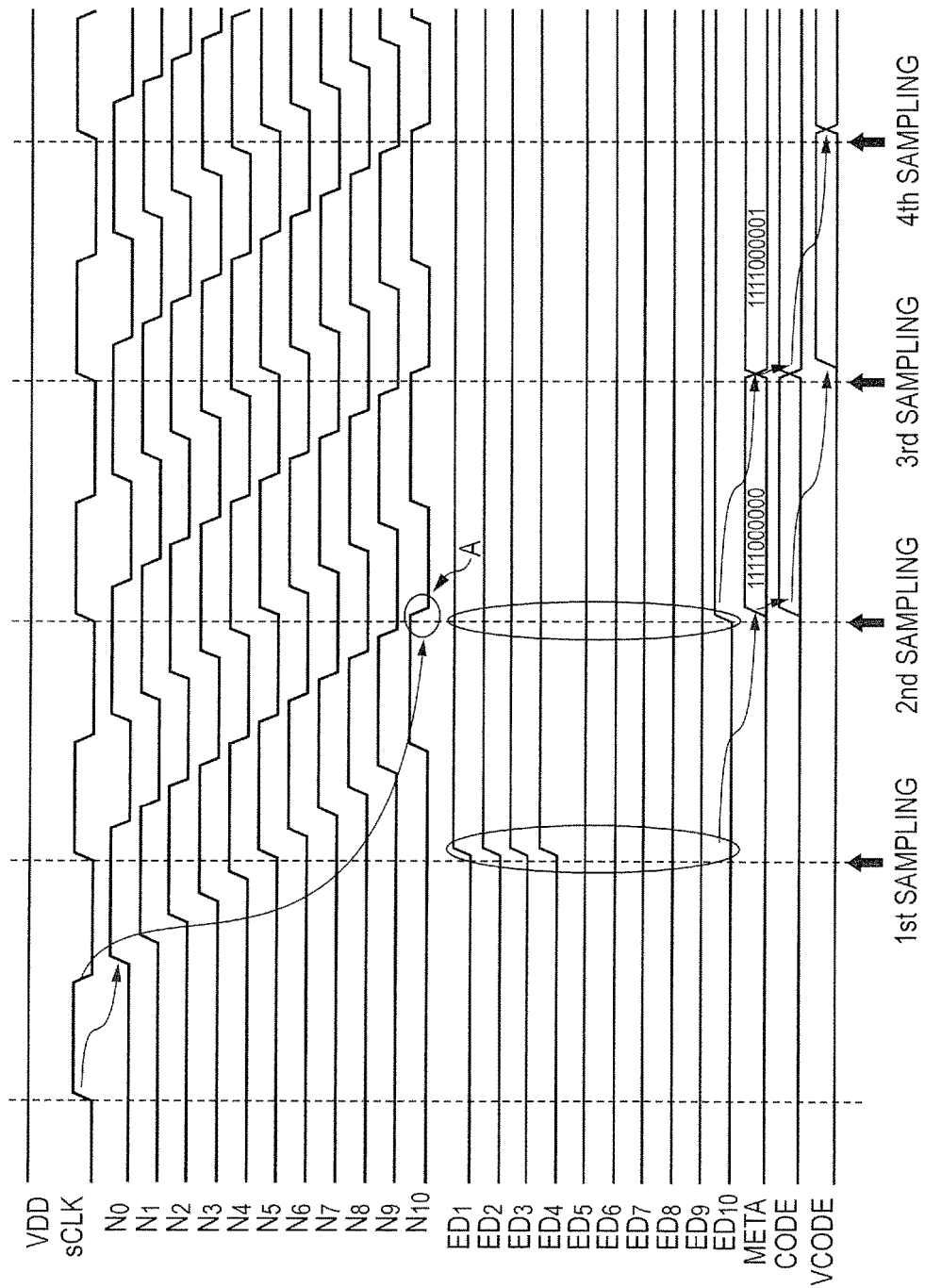
FIG. 13 is an operation waveform diagram showing a case of different results between the first sampling and the second and subsequent samplings by the voltage sensor.

FIG. 13 is an operation waveform diagram showing an example of different results between the first sampling and the second and subsequent samplings by the voltage sensor, in which the TDC circuit 112 with MSB=10 performs four samplings at a constant power supply voltage. The CLK pulse is delayed by the voltage control delay circuit 111, and reaches a node $N_0$. From the node $N_0$ to the node $N_{10}$, the pulse is delayed by buffers B1 to B10 between the respective nodes. At the first sampling, the nodes $N_1$ to $N_4$ are at "1" and the nodes $N_5$ to $N_{10}$ are at "0"; accordingly, the sampling result is ED[1:10]="1111000000". However, the delay of sCLK from the input of the voltage control delay circuit 111 to the node $N_{10}$ is large with respect to the period (Tsclk) of the clock signal (sCLK); accordingly, at the second sampling, the delay of the first sCLK pulse remains on the node $N_{10}$, as indicated by an arrow A. Therefore, not only the nodes $N_1$ to $N_4$ but also the node $N_{10}$ is at "1"; accordingly, the sampling result is ED[1:10]="1111000001", which is different from the first sampling result. The first voltage code (CODE, VCODE) is correct, but the second voltage code (CODE, VCODE) is incorrect. In the example of FIG. 13, the third and subsequent sampling results are the same as the second sampling result.

In the case where the delay of sCLK from the input of the voltage control delay circuit 111 to the node $N_{10}$ is very large with respect to the period (Tsclk) of the clock signal (sCLK) in the example of FIG. 13 or MSB is large (e.g., 128 bits), there occurs a case of a plurality of boundaries of "10" such as ED[1:128]=1111 . . . 1110000 . . . 0001111 . . . 1110000 in the second and subsequent samplings.

Figure 14:
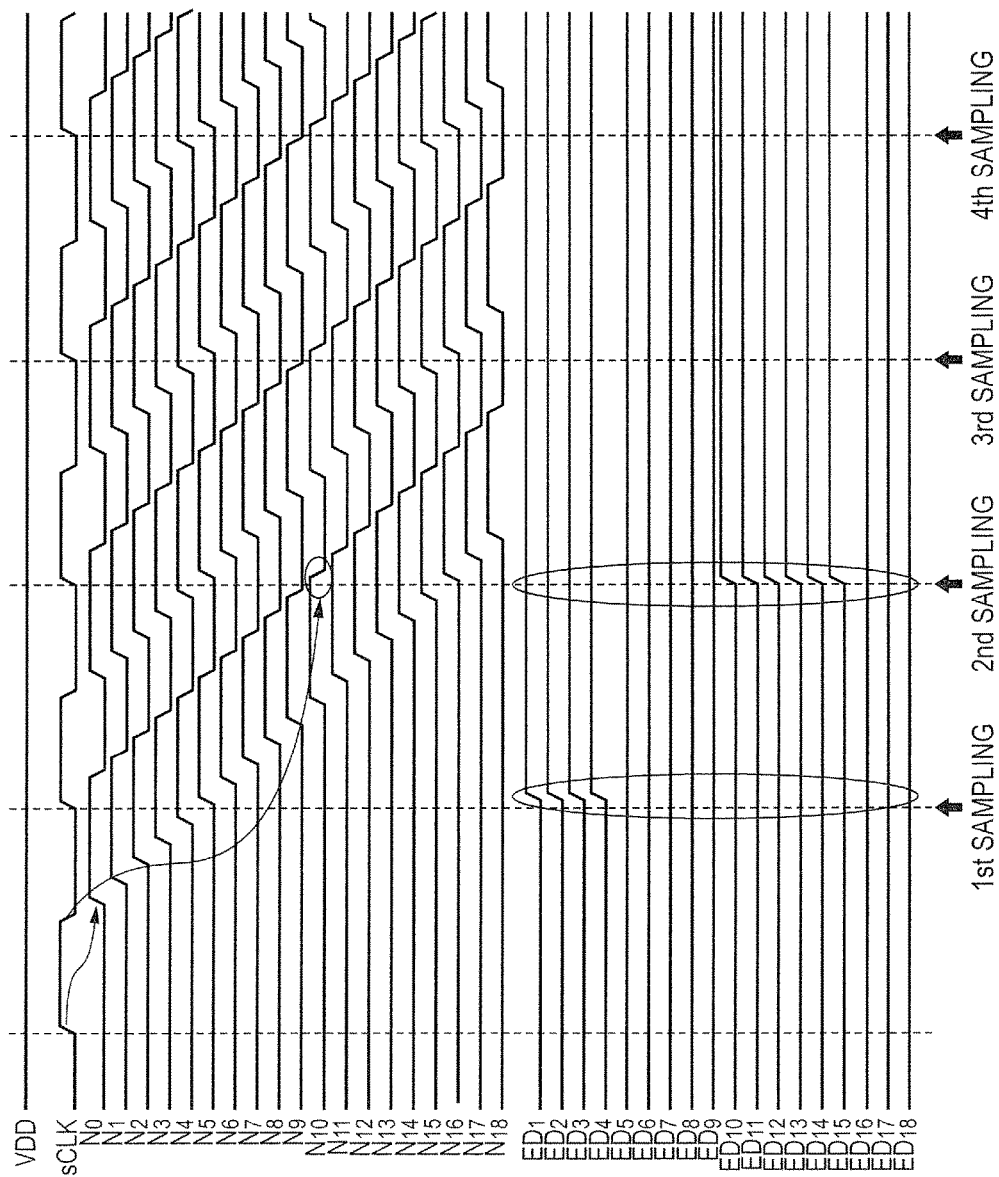
FIG. 14 is an operation waveform diagram showing an case of different results between the first sampling and the second and subsequent samplings by the voltage sensor.

FIG. 14 is an operation waveform diagram showing an example of different results between the first sampling and the second and subsequent samplings by the voltage sensor, in which the TDC circuit 112 with MSB=18 performs four samplings at a constant power supply voltage. In this example, the first sampling result is ED[1:18]= 1111_0000_0000_0000_00, whereas the second sampling result is ED[1:18]=1111_0000_0111_1110_00.

Figure 15:
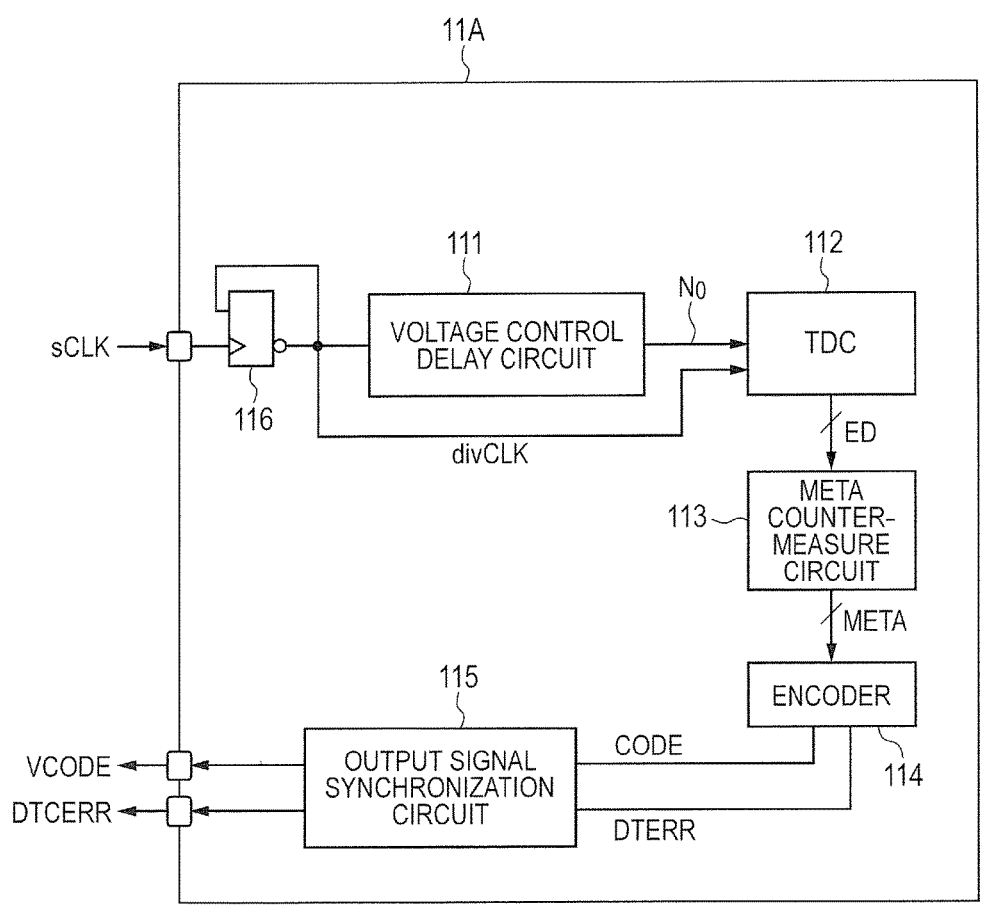
FIG. 15 is a block diagram showing another configuration example of the voltage sensor in FIG. 7.
Figure 16:
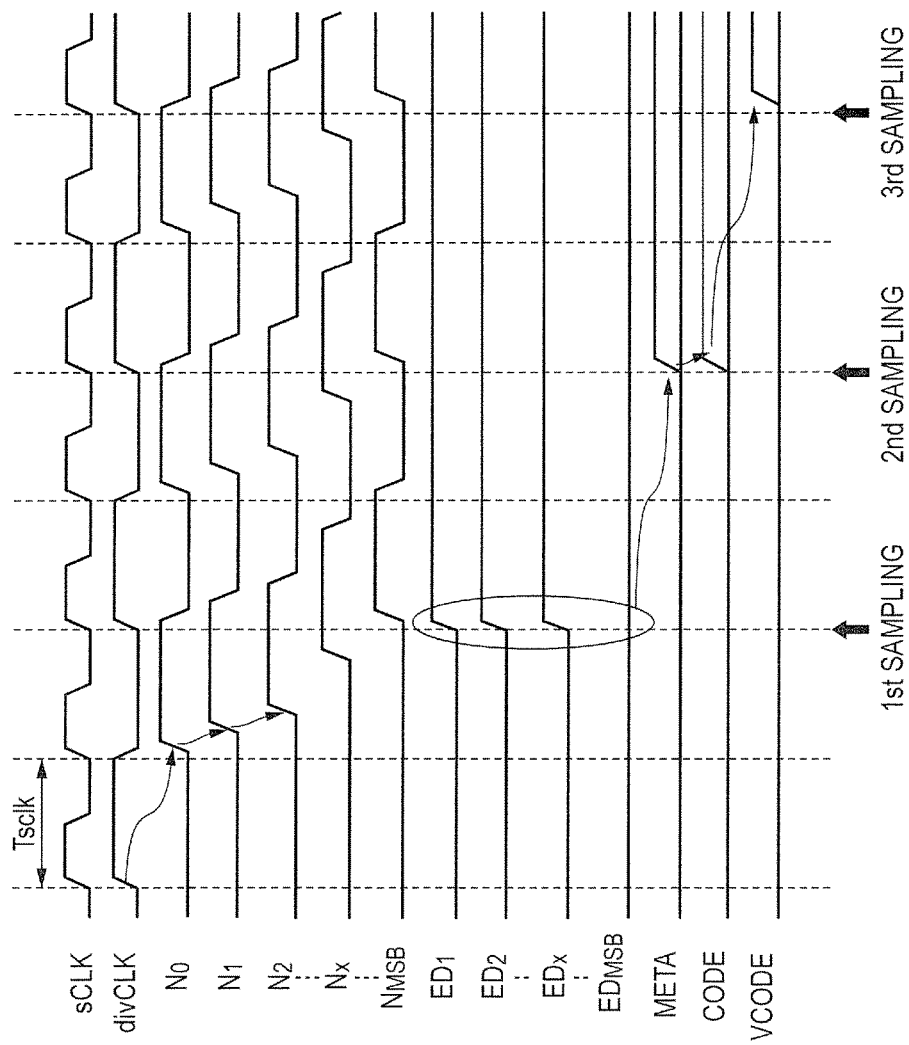
FIG. 16 is an operation waveform diagram of the voltage sensor of FIG. 15.

FIG. 15 is a block diagram showing another configuration example of the voltage sensor of FIG. 11. FIG. 16 is an operation waveform diagram of the voltage sensor of FIG. 15. To avoid the case of different results between samplings, the period of the sampling clock signal is made sufficiently large with respect to the delay of sCLK from the input of the voltage control delay circuit 111 to the node $N_{10}$. For example, a frequency division circuit 116 is disposed between the clock signal (sCLK) and the voltage control delay circuit 111 and the TDC circuit 112, and a frequency division signal (divCLK) having the ½ frequency of CLK is inputted to the voltage control delay circuit 111 and the TDC circuit 112. Thereby, the period of the sampling clock signal becomes 2×Tsclk, so that malfunctions due to different results between samplings can be avoided better than the voltage sensor of FIG. 7. However, in the TDC circuit 112 using the frequency division signal (divCLK), the sampling frequency is also divided, which decreases the sampling speed.

<Encoder>

Figure 17A:
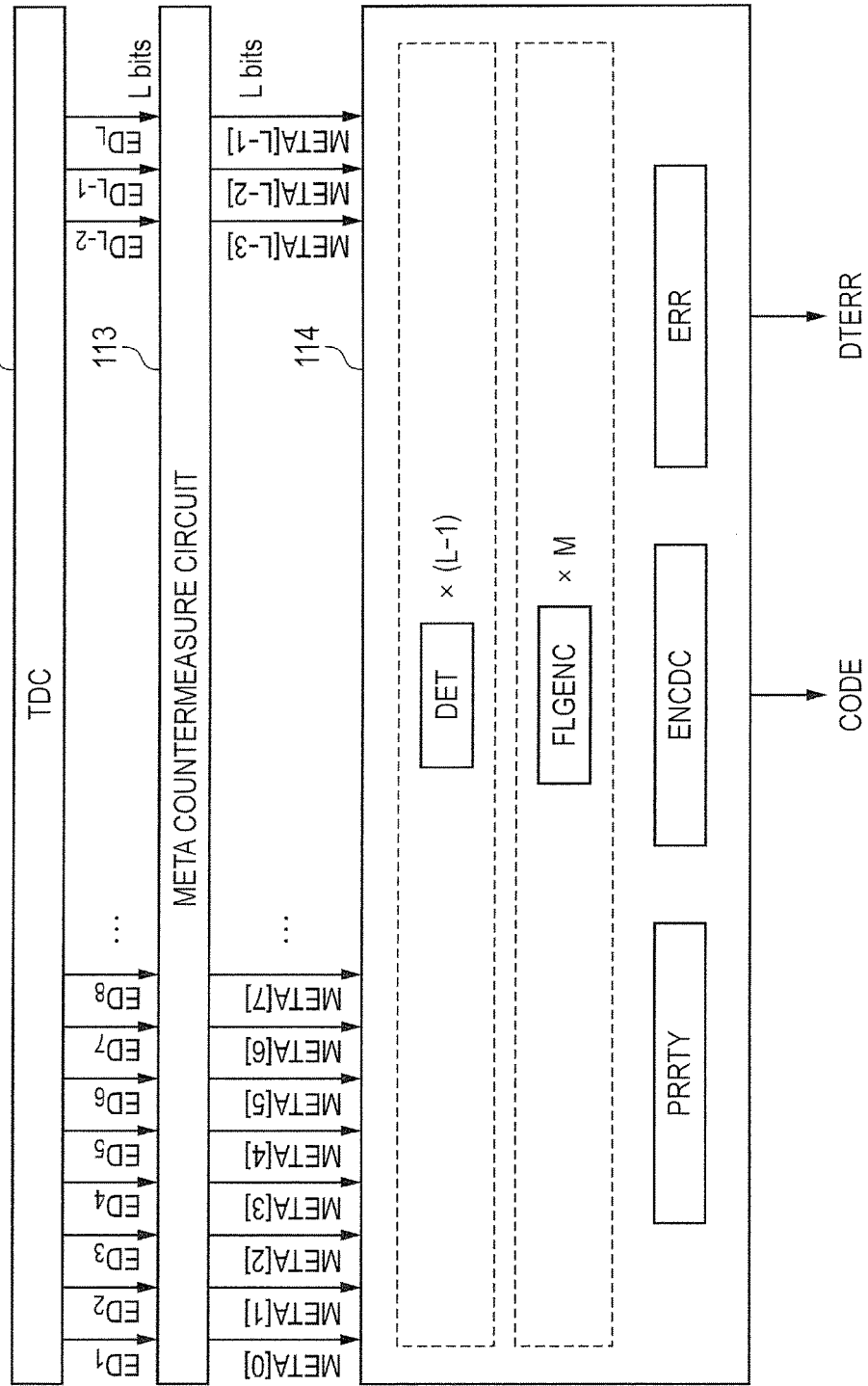
FIG. 17A is a block diagram showing the configuration of an encoder in FIG. 11.
Figure 17B:
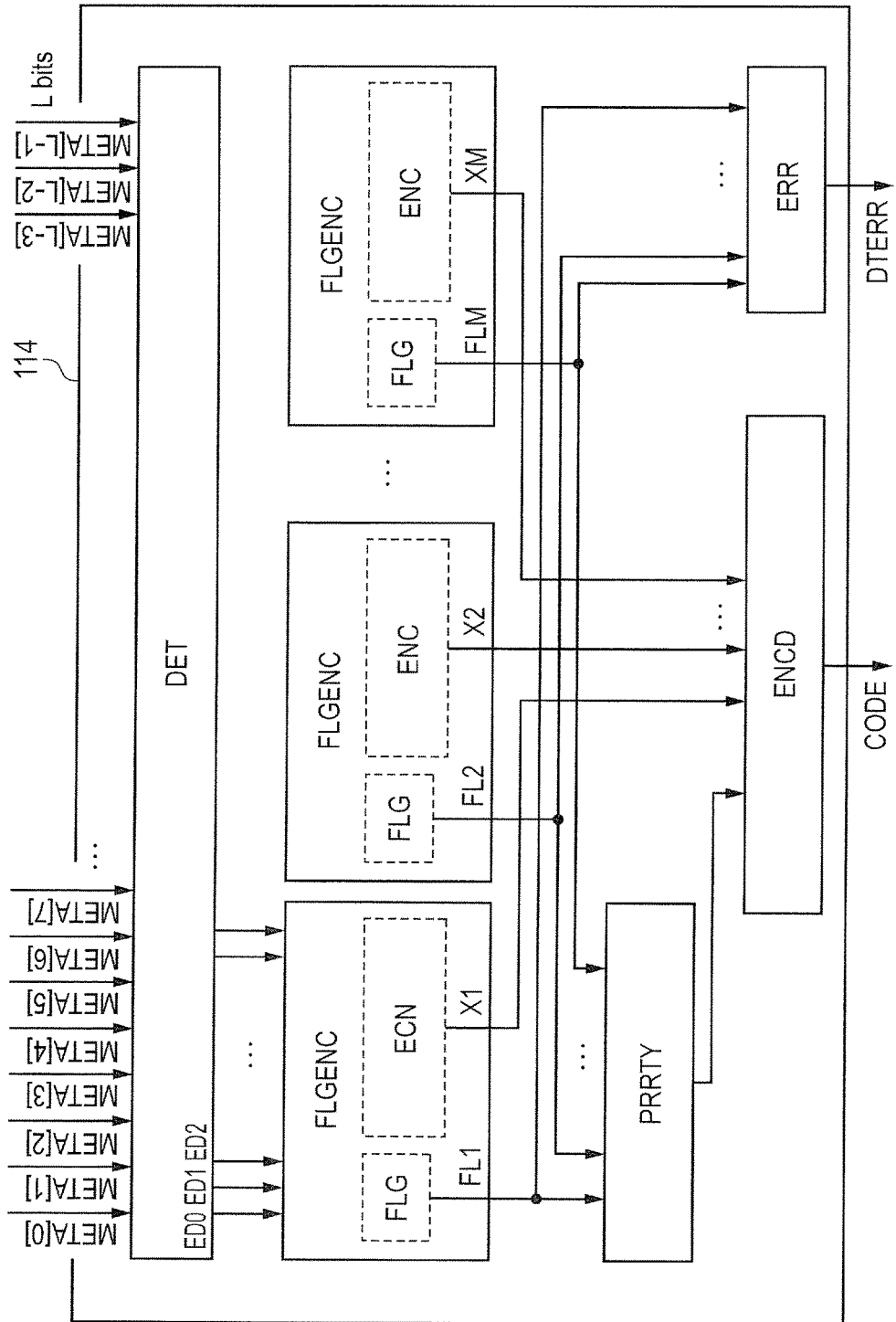
FIG. 17B is a block diagram showing the configuration of the encoder in FIG. 11.

FIGS. 17A and 17B are block diagrams showing the configuration of the encoder in FIG. 11.

A technique for preferentially encoding the first sampling result without exception in the case of different results between the first sampling and the second and subsequent samplings is applied to the encoder. For example, in the case of a long buffer chain such as MSB=128, that is, in the presence of a plurality of boundaries of "10" such as ED[1:128]=1111 . . . 1110000 . . . 0001111 . . . 1110000, encoding is performed in accordance with the "10" boundary on the lower bit side.

The encoder 114 includes an element circuit DET, an element circuit FLGENC, an element circuit PRRTY, an element circuit ENCD, and an element circuit ERR.

The element circuit DET acquires two adjacent bits of L-bit output signals (META[0] to META[L−1]) of the META countermeasure circuit 113, and sets an output signal (DE) to "1" in the case of "1" on the lower bit side and "0" on the higher bit side (in the presence of the "10" boundary). The element circuit DET sets the output signal (DE) to "0" in the case of "0" on the lower bit side and "0" on the higher bit side, in the case of "0" on the lower bit side and "1" on the higher bit side, or in the case of "1" on the lower bit side and "1" on the higher bit side (in the absence of the "10" boundary).

The element circuit FLGENC includes an element circuit FLG and an element circuit ENC. In the presence of "1" in bundled signals of every N bits of the output signals (DE) of the element circuit DET (in the presence of the "10" boundary), the element circuit FLG outputs "1" as an output signal (FL), and the element circuit ENC outputs an encoded result according to the "10" boundary position, as an output signal (X). In the absence of "1" in the bundled signals (in the absence of the "10" boundary), the element circuit FLG outputs "0" as the output signal (FL), and the element circuit ENC does nothing.

The element circuit PRRTY receives the output signals (FL) from the M element circuits FLGENC, and detects a bundle (element circuit FLGENC) where the "10" boundary is present. At this time, if a plurality of "10" boundaries are present, the "10" boundary on the lower bit side is prioritized.

From the encoded result according to the "10" boundary position in the bundle indicated by the element circuit PRRTY, the element circuit ENCD acquires the "10" boundary position of META, and performs encoding. The encoded result is outputted as CODE.

The element circuit ERR sets a (DTERR) signal to "1" if the sampling result is abnormal or the "10" boundary is not present (i.e., the voltage or the clock frequency is out of a circuit operation range).

Figure 18A:
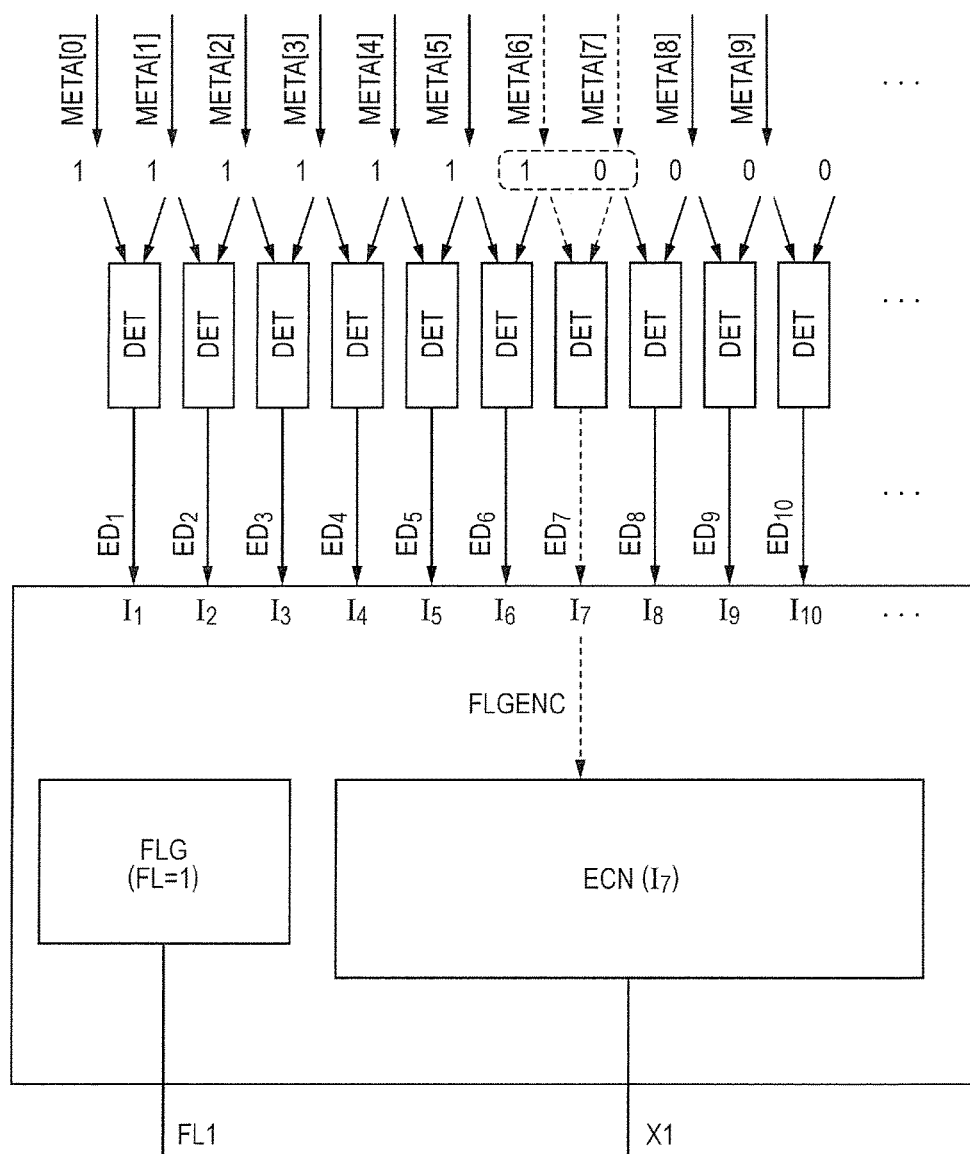
FIG. 18A is an image diagram of encoder internal processing in the presence of the "10" boundary between META[6] and META[7].
Figure 18B:
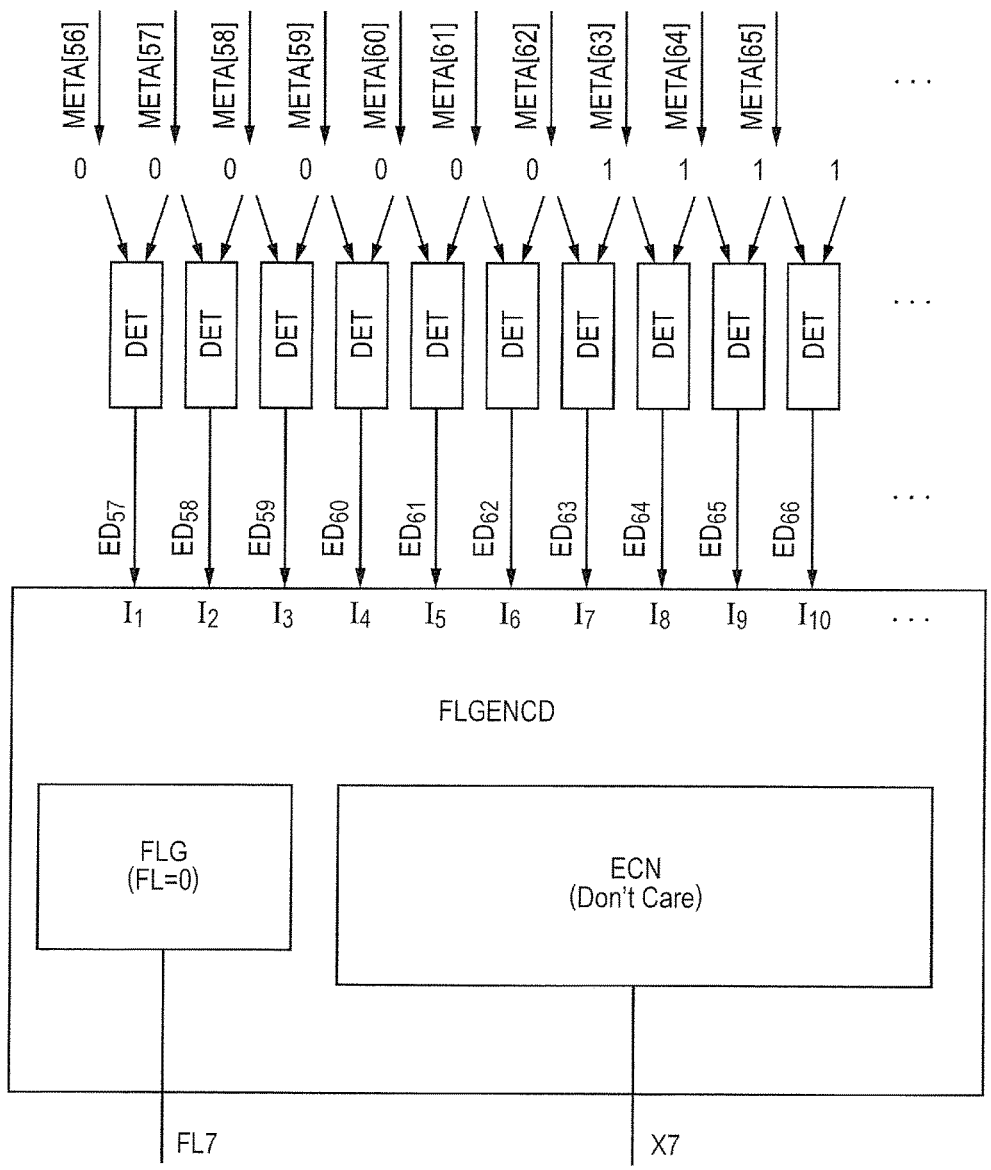
FIG. 18B is an image diagram of encoder internal processing in the absence of the "10" boundary.
Figure 18C:
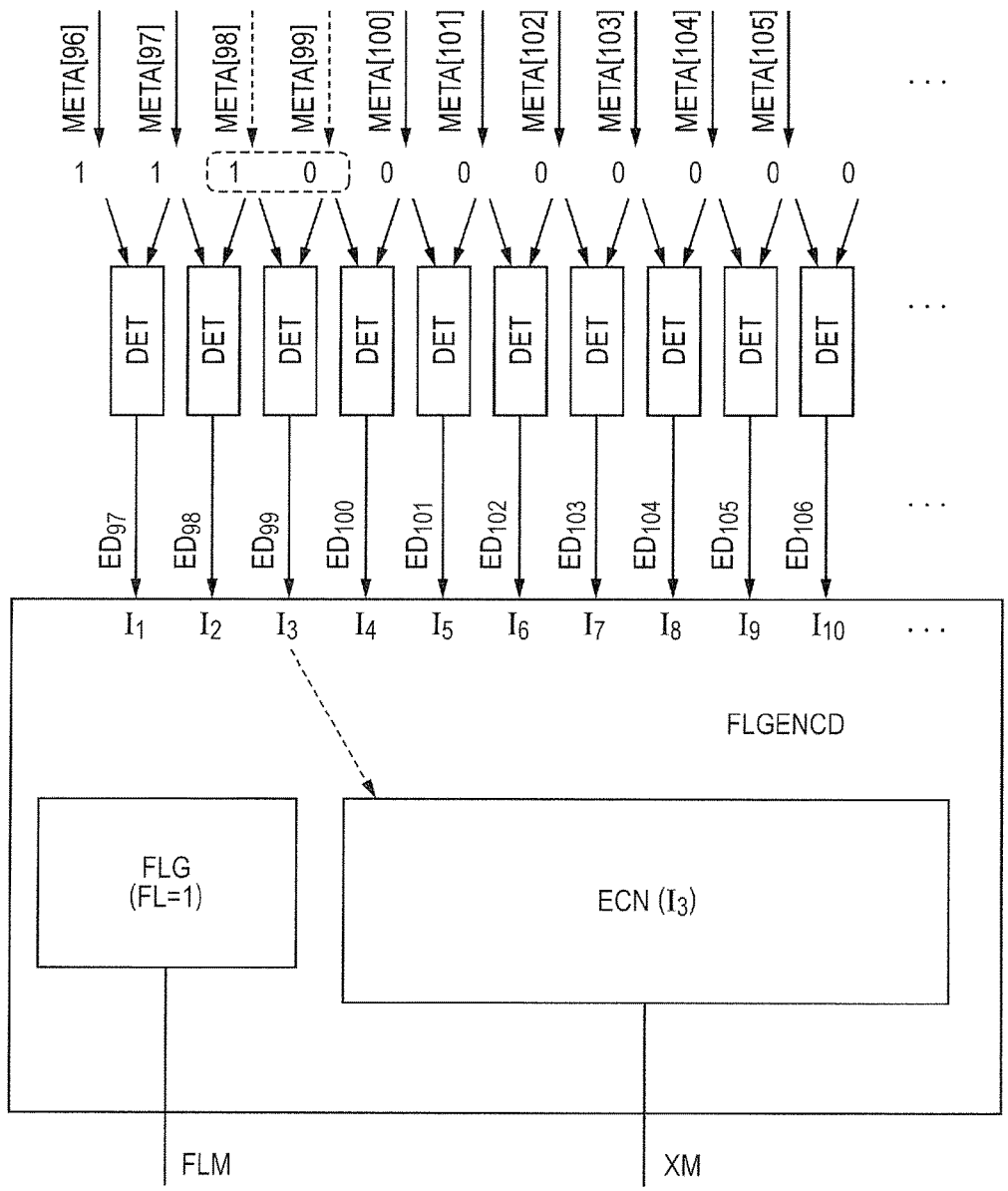
FIG. 18C is an image diagram of encoder internal processing in the presence of the "10" boundary between META[98] and META[99].

FIG. 18A is an image diagram of encoder internal processing in the presence of the "10" boundary between META[6] and META[7]. FIG. 18B is an image diagram of encoder internal processing in the absence of the "10" boundary. FIG. 18C is an image diagram of encoder internal processing in the presence of the "10" boundary between META[98] and META[99]. In the case of simultaneous occurrence of FIGS. 18A, 18B, 18C at one sampling, two "10" boundaries are present; therefore, the "10" boundary on the lower bit side, that is, between META[6] and META[7] is preferentially encoded. First, in the element circuit DET, due to the presence of the "10" boundaries between META[6] and META[7] and between META[98] and META[99], $ED_7$ and $ED_{99}$ are "1". $ED_7$ in the first bundle is inputted to the first element circuit FLGENC, and $ED_{99}$ in the Mth bundle is inputted to the Mth element circuit FLGENC. In response to $ED_7=1$ and $ED_{99}=1$, the first element circuit FLGENC outputs "1" as FL1 and an encoded result corresponding to $I_7$ as X1, and the Mth element circuit FLGENC outputs "1" as FLM and an encoded result corresponding to $I_3$ as XM. From $FL_1=1$ and $FL_M=1$, the element circuit PRRTY prioritizes $FL_1$ on the lower bit side, and informs the presence of the "10" boundary in the first bundle to the element circuit ENCD. From the encoded result corresponding to the "10" boundary in the first bundle in accordance with the signal from the element circuit PRRTY, the element circuit ENCD acquires the META "10" boundary position of META[6]-META[7], and outputs the encoded result corresponding to META[6]-META[7] as CODE. In this example, due to the presence of the "10" boundary, DTERR is "0".

It is possible to avoid malfunctions due to different results between samplings.

<Voltage Drop Determination Circuit>

The voltage drop determination circuit which generates the clock stop signal in accordance with the determination mode set from the outside will be described. As shown in FIG. 9, the voltage drop determination circuit 12 is comprised of the sense result history value holding circuit 121 which holds the history from the latest to the mth previous sense results of the voltage sensor 11, the computation circuit 122 which computes the sense result, the computation result selection circuit 123 which selects the computation result in accordance with the algorithm set by the register value, and the determination circuit 124 which compares the computation result with the threshold set by the register value, and generates the CLK stop signal if the computation value<the threshold.

Each computation mode of an absolute value computation, an average value computation, a variation value computation, and a prediction computation will be described by way of example of a sense result history value holding number=8.

(Absolute Value Computation)

Figure 19:
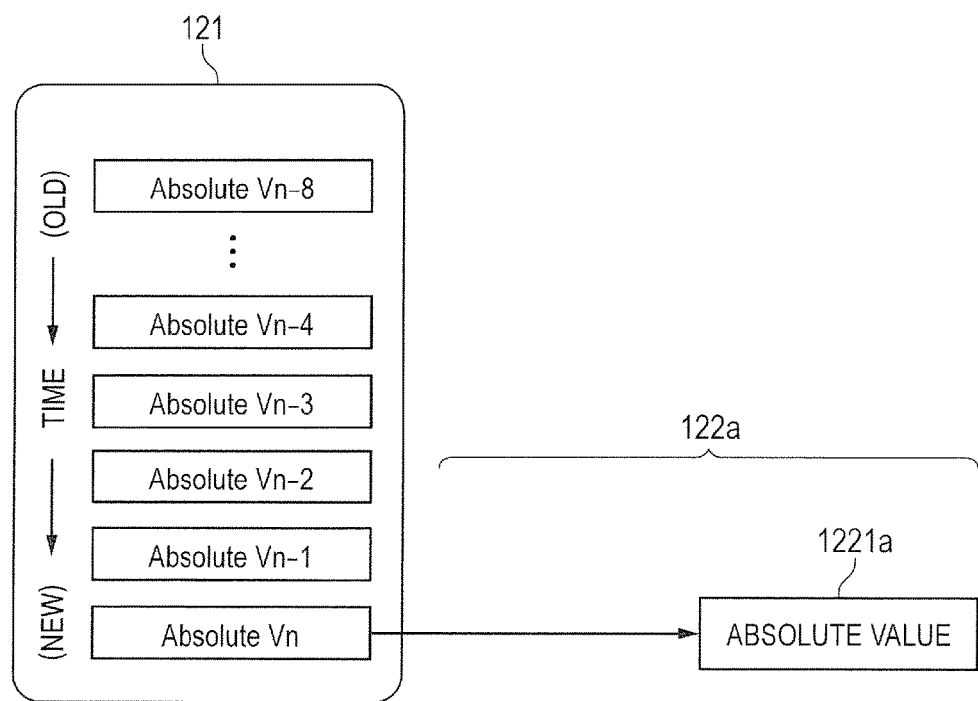
FIG. 19 is a flow diagram of an absolute value computation.

FIG. 19 is a flow diagram of the absolute value computation. In the absolute value computation, the latest sense value (Absolute Vn) of the sense result history holding circuit 121 is outputted. An absolute value computation circuit 122a can be comprised of a register etc.

(Average Value Computation)

Figure 20:
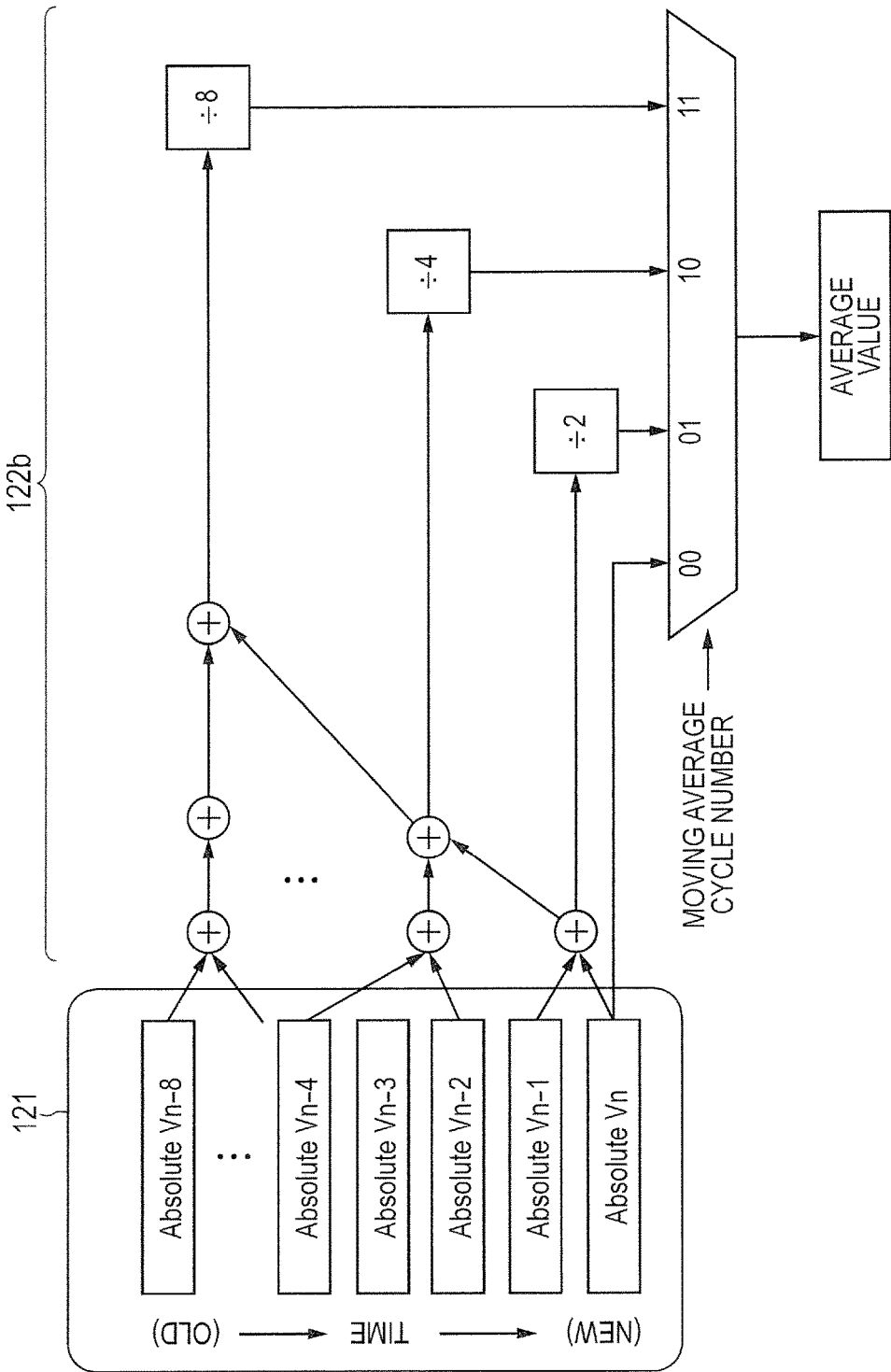
FIG. 20 is a flow diagram of an average value computation.

FIG. 20 is a flow diagram of the average value computation. In the average value computation, an average value is calculated, using the sense result history, based on a moving average cycle number (the number of moving average cycles to be obtained) set by the register value. One of the average values of previous 1/2/4/8 cycles is selected as the moving average cycle number. For example, if the moving average cycle number=4, an average value from the latest sense value (Absolute Vn) to the fourth previous sense value (Absolute Vn–4) is calculated and outputted. An average value computation circuit 122b can be comprised of adders, dividers, a selection circuit, a register, and the like.

(Variation Value Computation)

Figure 21:
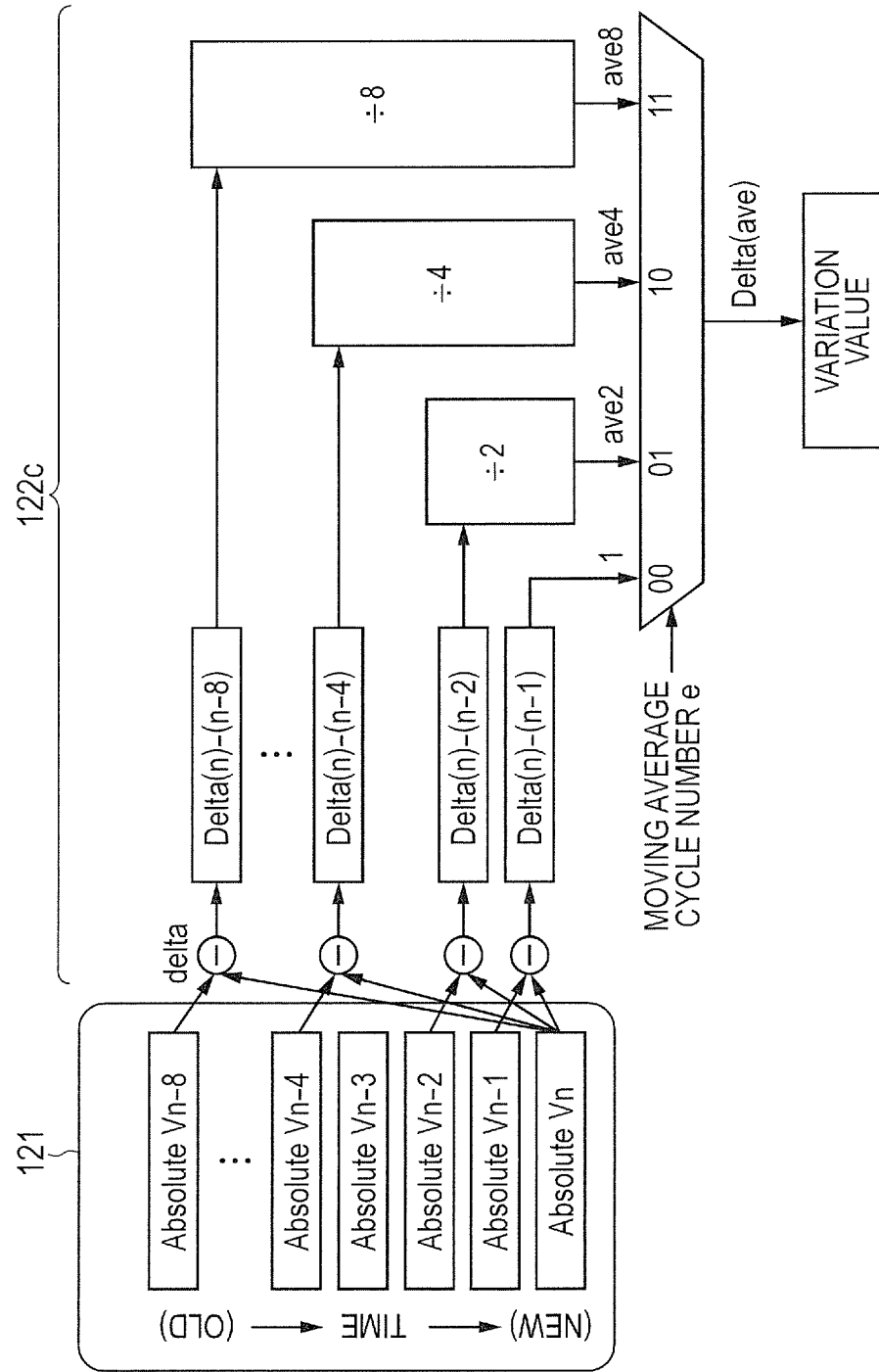
FIG. 21 is a flow diagram of a variation value computation.

FIG. 21 is a flow diagram of the variation value computation. In the variation value computation, using the sense result history, based on the moving average cycle number set by the register value, the difference (Delta(n)–(n–1), Delta(n)–(n–2), Delta(n)–(n–4), Delta(n)–(n–8)) between the latest sense value (Absolute Vn) and the mth previous sense value (Absolute Vn–m) is calculated, and then the average value of the difference is calculated and outputted as a variation value. One of the average values of previous 1/2/4/8 cycles is selected as the moving average cycle number. For example, if the moving average cycle number=4, the variation value is (the latest sense value (Absolute Vn)–the fourth previous sense value (Absolute Vn–4))/4. A variation value computation circuit 122c can be comprised of subtracters (adders), dividers, a selection circuit, a register, and the like.

(Prediction Computation)

Figure 22:
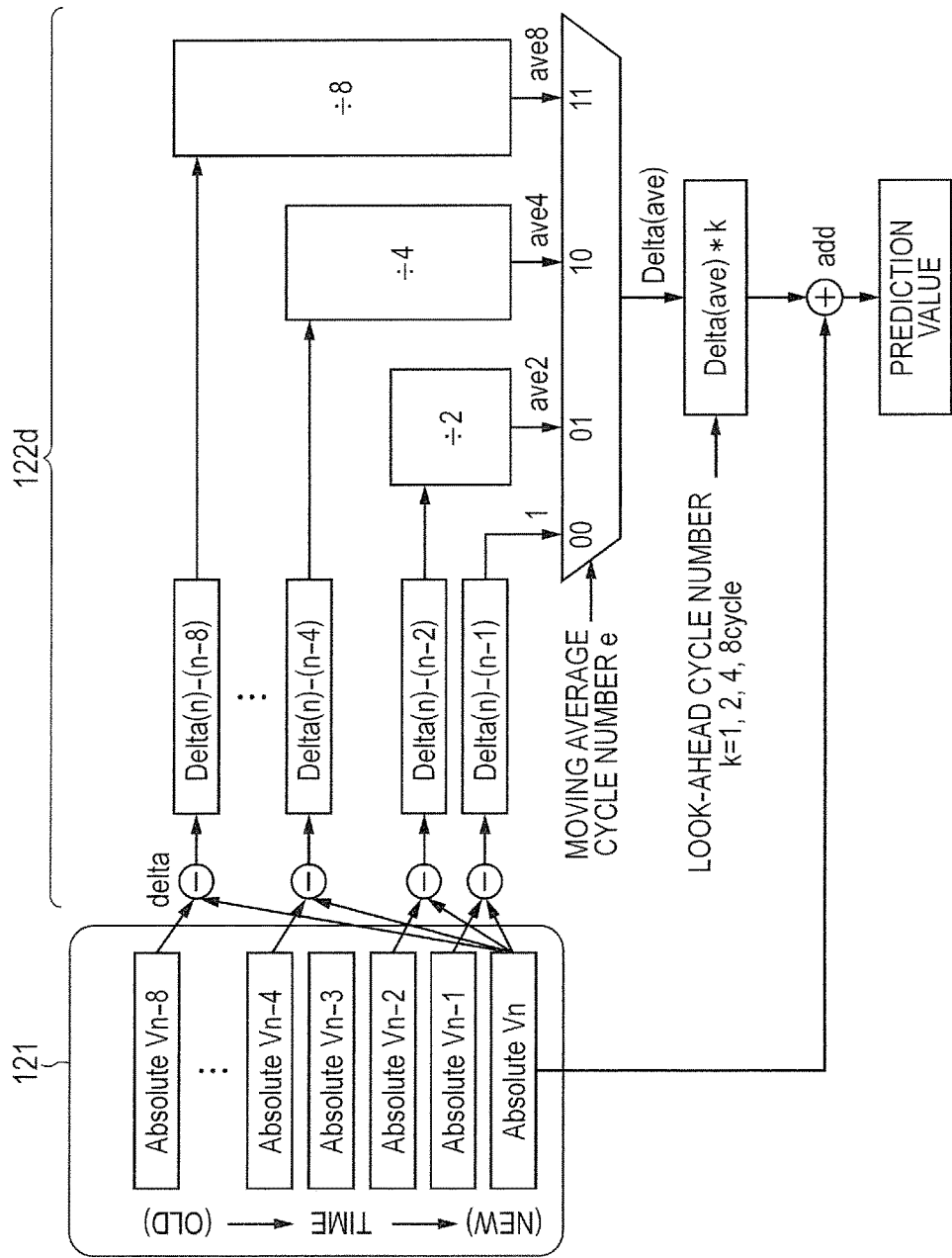
FIG. 22 is a flow diagram of a prediction computation.

FIG. 22 is a flow diagram of the prediction computation. In the prediction computation, as in the variation value calculation, based on the moving average cycle number set by the register value, the difference (Delta(n)–(n–1), Delta(n)–(n–2), Delta(n)–(n–4), Delta(n)–(n–8)) between the latest sense value (Absolute Vn) and the mth previous sense value (Absolute Vn–m) is calculated, and the average value of the difference is obtained, thus calculating the variation value (Delta(ave)). One of the average values of previous 1/2/4/8 cycles is selected as the moving average cycle number. Further, based on a look-ahead cycle number (the number of look-ahead cycles) set from the outside, an integrated value (Delta(ave)*k) of the variation value and the look-ahead cycle number is calculated. The look-ahead cycle number (k) is one of 1/2/4/8 cycles. The integrated value (Delta(ave)*k) and the latest sense value (Absolute Vn) are added, thus outputting a variation prediction value (look-ahead Absolute Vn). For example, if the moving average cycle number=4 and the look-ahead cycle number=2, the prediction result is {(the latest sense value (Absolute Vn)−the fourth previous sense value (Absolute Vn−4))/4}*2+the latest sense value (Absolute Vn). A prediction computation circuit 122*d* can be comprised of subtracters (adders), dividers, a selection circuit, a multiplier, an adder, a register, and the like.

(Prediction Computation with Mask Function)

Figure 24A:
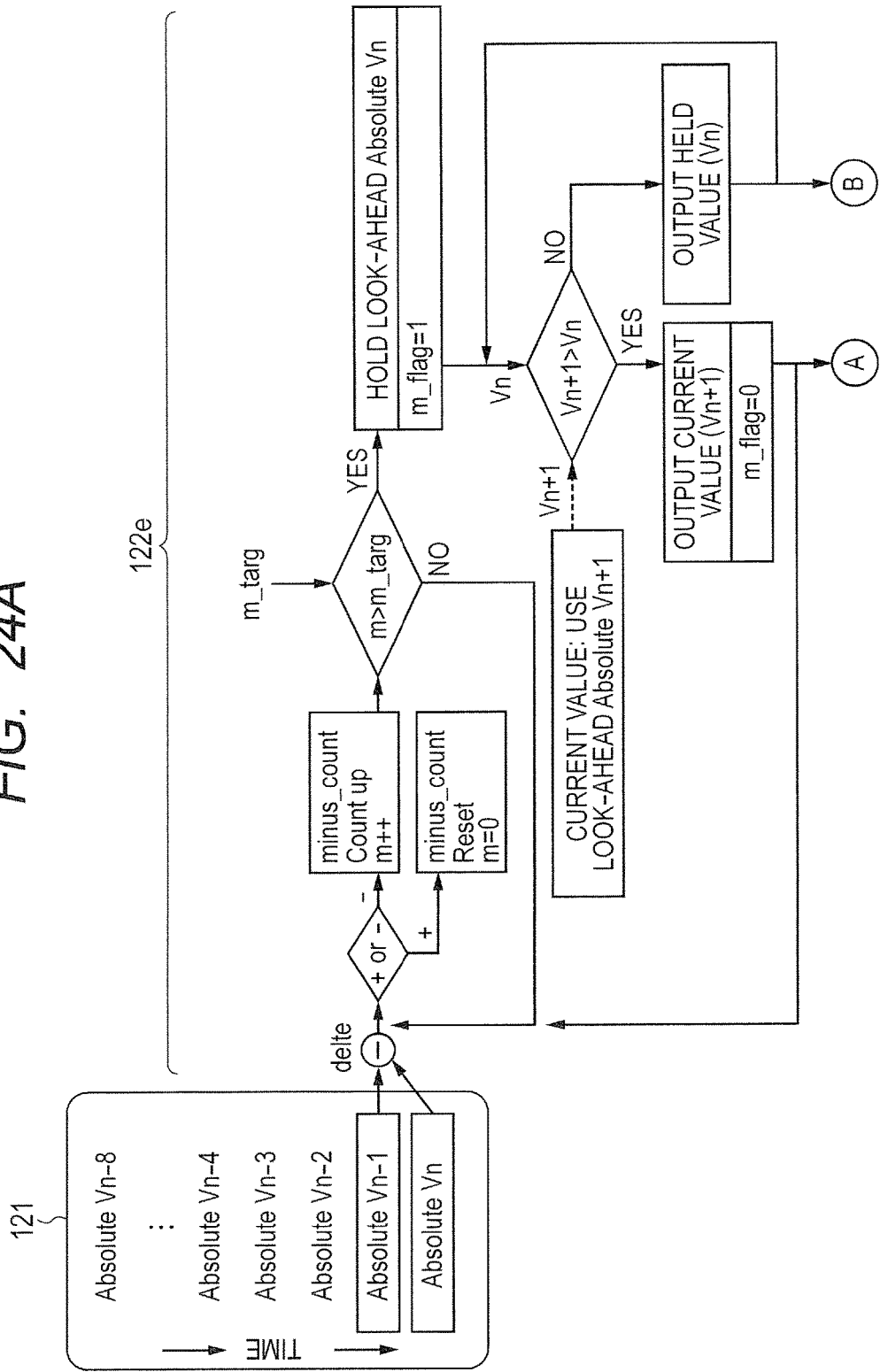
FIG. 24A is a flow diagram of the prediction computation with the mask function.

FIG. 23 is a voltage waveform image diagram for explaining a mask function. FIGS. 24A and 24B are flow diagrams of the prediction computation with the mask function. The above-described prediction computation is basically prediction, and has a deviation from the absolute value, so that the prediction value might diverge greatly from the actual value. To reduce the prediction error, the prediction value is masked if the differential value of the prediction value is continuously negative for predetermined cycles. As shown in FIG. 23, a look-ahead voltage waveform B diverges greatly from an actual voltage waveform A. Accordingly, if a negative gradient (−) in the prediction value graph continues for four cycles (part C in FIG. 23), a value when the negative gradient has continued for four cycles is held (broken line D). When the prediction value exceeds the held value, the held value is discarded, and the prediction value is updated (E). Thus, the value with a large error is masked.

As shown in FIG. 24A, in the computation, the difference (delta) between the latest sense value (Absolute Vn) and the previous sense value is obtained, and it is determined whether the difference is positive or negative. If the difference is positive, a variable (minus count) is set to 0, and if the difference is negative, the variable (minus count) is counted up. If the variable (minus count) is not greater than a negative delta continuation value (m_targ) set by the register value, the count is continued, and if the variable (minus count) is greater than m_targ, the prediction value (look-ahead Absolute Vn) calculated in the prediction computation is held, and m_flag is set to 1. In the example shown in FIG. 23, the delta continuation value (m_targ) is 4. After the prediction value is held, the held value (Vn) and the latest prediction value (Vn+1) are compared in magnitude. If the held value≥the latest variation prediction value, the held value is outputted. If the held value<the latest variation prediction value, the held value is discarded, and the latest prediction value is outputted. Further, m_flag is initialized to 0, and the flow returns to the positive/negative determination of the gradient of the prediction value.

As shown in FIG. 24B, whether or not to use the mask function is controlled by a mask enable signal (mask_enable). If the mask enable signal (mask_enable) is 1, m_flag is transferred to a selector, and if m_flag is 1, the held value (Vn) is outputted as a look-ahead value with the mask; if m_flag is 0, the latest prediction value (Vn+1) is outputted as the look-ahead value with the mask, so that the variation prediction value is obtained. If the mask enable signal (mask_enable) is 0, the latest prediction value (Vn+1) is always outputted, and the mask function is disabled. A prediction computation circuit 122*e* with the mask function can be comprised of a subtracter (adder), a counter, comparators, registers, a selection circuit, and the like, in addition to the prediction computation circuit 122*d*.

Thus, by preparing various algorithms in the voltage drop determination circuit, it is possible to determine the voltage value that causes a malfunction by voltage fluctuation at the time of various load fluctuations. Further, the look-ahead algorithm can suppress the latency from the voltage sense to the clock stop and protect the system from a critical power supply voltage drop with higher accuracy. The prediction computation algorithm with the mask function can reduce the prediction error.

<Clock Control Circuit>

Figure 25:
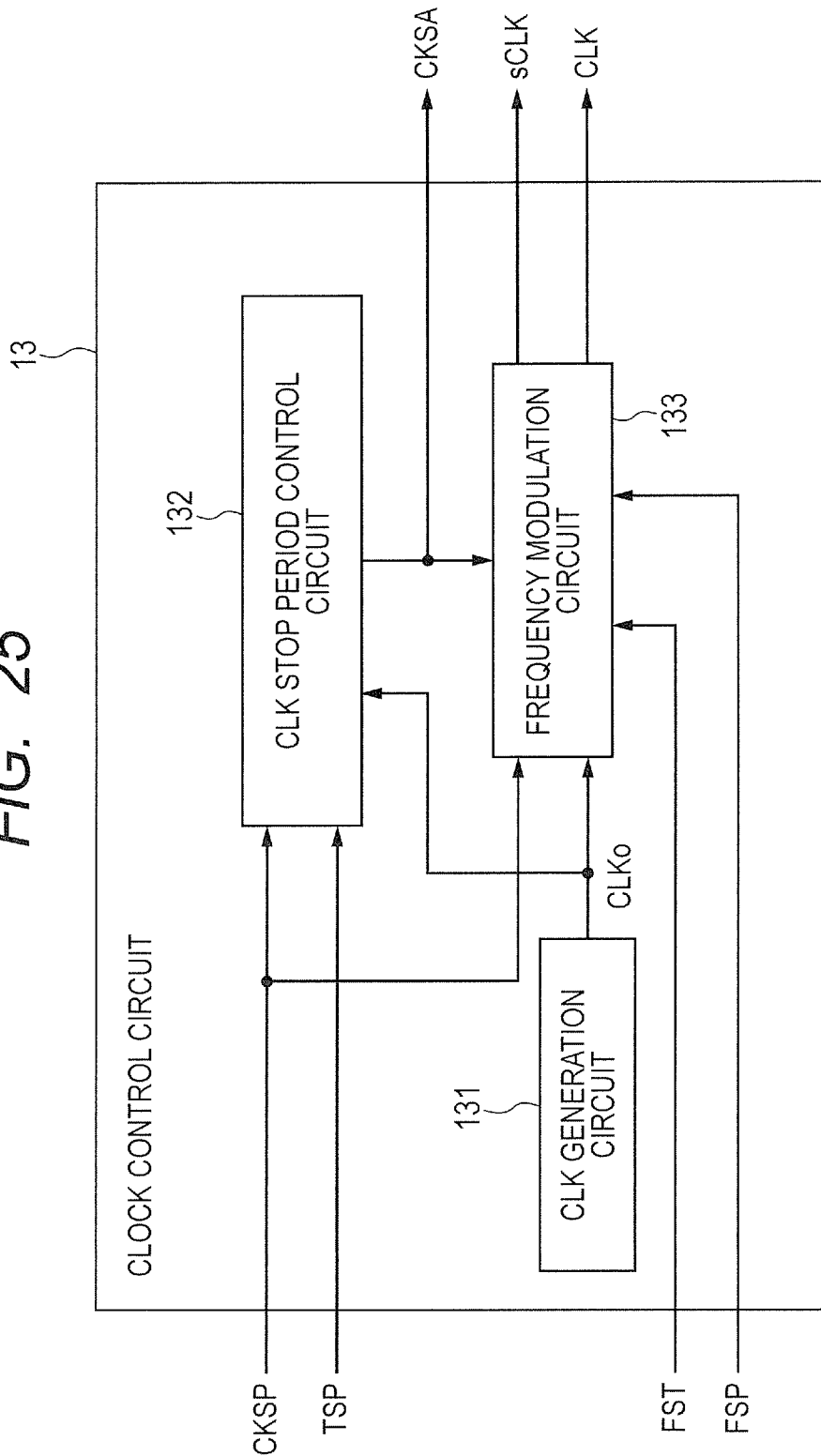
FIG. 25 is a block diagram of a clock control circuit.

FIG. 25 is a block diagram showing the configuration of the clock control circuit. The clock control circuit 13 includes a CLK generation circuit 131, a CLK stop period control circuit 132, and a frequency modulation circuit 133. The CLK generation circuit 131 is comprised of, e.g., a PLL (Phase Locked Loop), and generates a clock signal (CLKo). The CLK stop period control circuit 132 stops or slows down the clock (CLK stop), based on the clock stop signal (CKSP). With the speed (frequency) to which the clock is slowed down, the power supply voltage fluctuation is small even though the clock is operating, and preferably as small as that of the clock stop. Further, the CLK stop period control circuit 132 controls a period for stopping the clock or a period for slowing down the clock (CLK stop period), based on the clock stop period (TSP). The clock stop period (TSP) is stored in a register in the CLK stop period control circuit 132. For example, the CLK stop period control circuit 132 measures the clock signal (CLKo) with a counter, and compares the count value with the clock stop period (TSP). If the count value exceeds the clock stop period (TSP), the CLK stop period control circuit 132 issues a CLK restart signal (CKSA).

The frequency modulation circuit 133 modulates the frequency of the clock signal (CLKo), based on a frequency modulation value (FSP) and the CLK restart step value (FST). The frequency during the CLK stop is set by the frequency modulation value (FSP), and if the frequency is 0, the clock is stopped. A step value for increasing the frequency after the CLK restart in a stepwise manner is set by the CLK restart step value (FST). The frequency modulation value (FSP) and the CLK restart step value (FST) are stored in registers in the frequency modulation circuit 133. When the voltage sensor is operating, the clock signal (sCLK) is outputted even during the CLK stop.

Figure 26A:
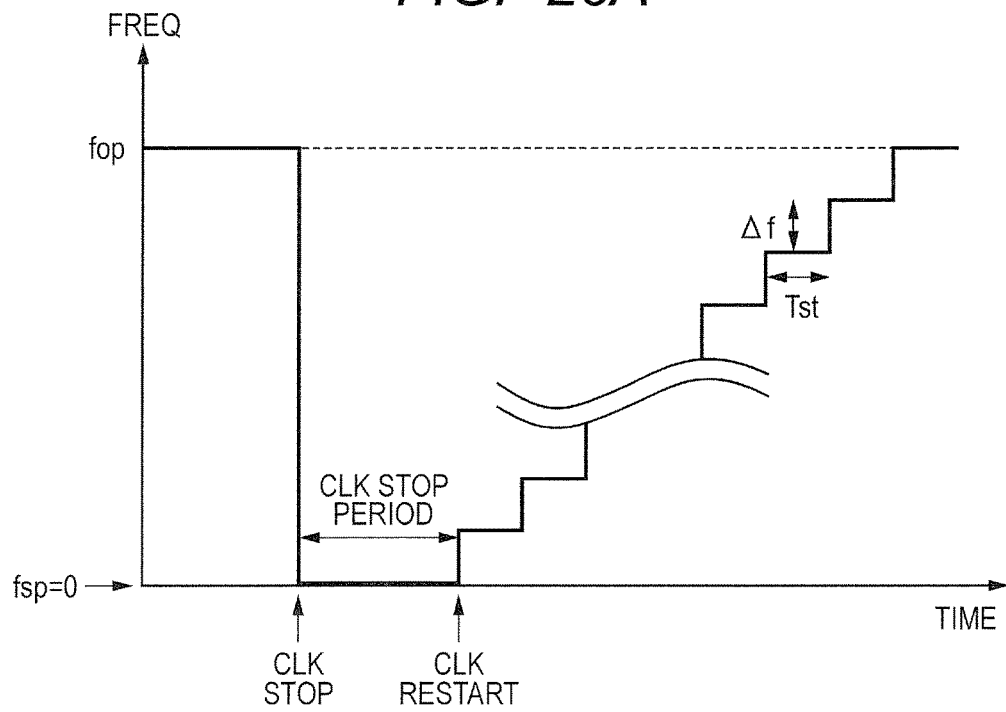
FIG. 26A is a frequency control image diagram of the clock control circuit.
Figure 26B:
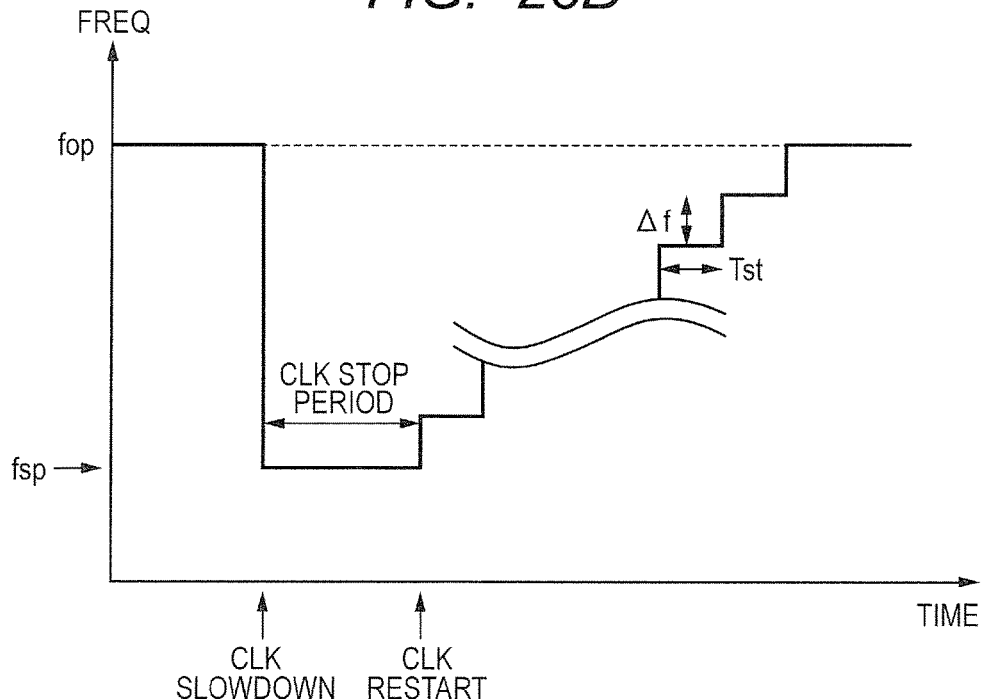
FIG. 26B is a frequency control image diagram of the clock control circuit.

FIGS. 26A and 26B are image diagrams for explaining frequency modulation. In response to the clock stop signal (CKSP), the frequency modulation circuit 133 performs frequency modulation according to the frequency modulation value during the CLK stop. The frequency modulation value (FSP) can be set to the setting value of the CLK stop (fsp=0) as shown in FIG. 26A, and also to the setting value of the CLK slowdown (0<fsp<fop) as shown in FIG. 26B. In response to the CLK restart signal (CKSA), the frequency modulation circuit 133 restarts the clock, and increases and returns the frequency in a stepwise manner (by Δf per step time (Tst)) in accordance with the CLK restart step value (FST), up to the frequency (fop) before the CLK stop. Tst and Δf do not need to be constant, and may increase or decrease with time.

Figure 27:
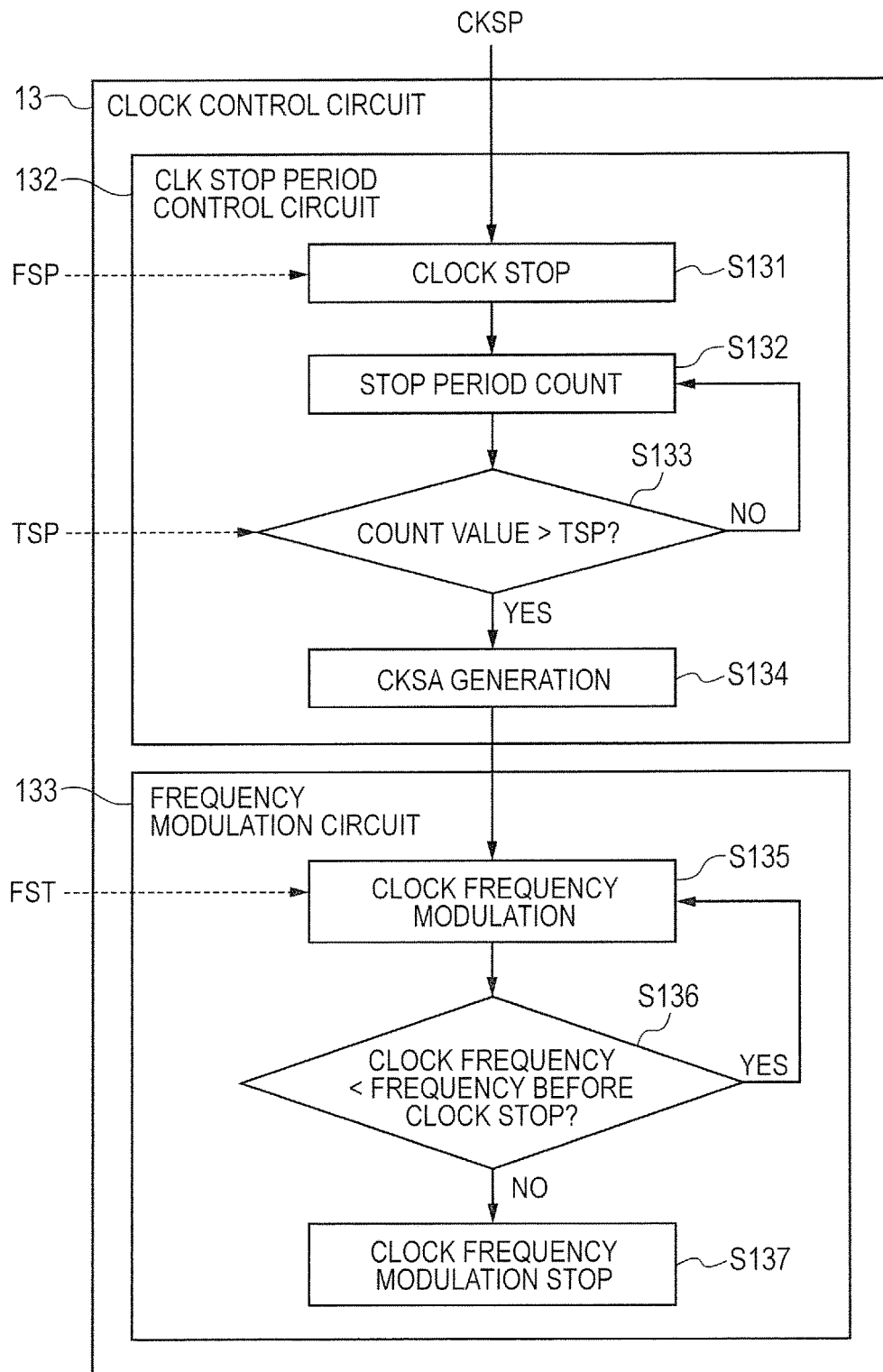
FIG. 27 is a control flow diagram of the clock control circuit.

FIG. 27 is a flow diagram showing the operation of the clock control circuit.

Step S131: In response to the CLK stop signal (CKSP), the CLK stop period control circuit 132 of the clock control circuit 13 stops or slows down the clock. Based on the frequency modulation value (FSP) during the CLK stop, the clock is stopped, or the clock frequency is set to a specified low frequency.

Step S132: After the CLK stop, the CLK stop period control circuit 132 counts the CLK stop period (clock signal (CLKo)).

Step S133: The CLK stop period control circuit 132 determines whether the count value is larger than the setting value of the clock stop period (TSP). If YES, the flow moves to step S134. If NO, the flow returns to step S132.

Step S134: The CLK stop period control circuit 132 generates the CLK restart signal (CKSA).

Step S135: In response to the clock restart signal (CKSA), the frequency modulation circuit 133 increases the clock frequency in a stepwise manner in accordance with the CLK restart step value (FST).

Step S136: The frequency modulation circuit 133 determines whether the clock frequency is smaller than the frequency (fop) before the CLK stop. If YES, the flow returns to step S135. If NO, the flow moves to step S137.

Step S137: The clock frequency modulation is stopped.
Second Embodiment

Figure 28:
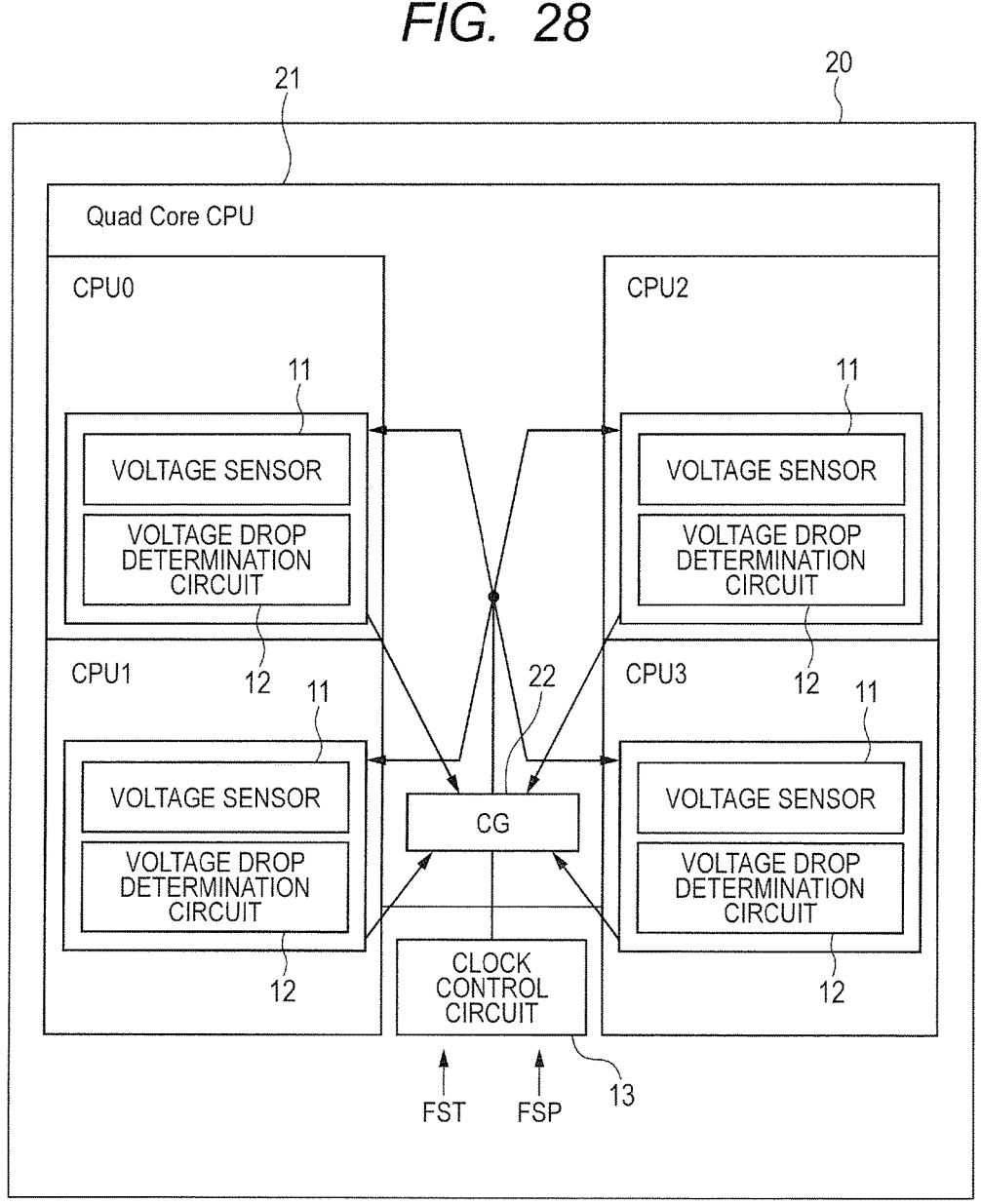
FIG. 28 is a layout image diagram of a semiconductor device according to a second embodiment.

FIG. 28 is a layout image diagram of a semiconductor device according to a second embodiment. The semiconductor device 20 according to the second embodiment includes a quad-core CPU 21 having an operation frequency (clock frequency) of 1.5 GHz and the clock control circuit 13. The quad-core CPU 21 includes four CPUs (CPUs 0-3) and a clock gate circuit (CG) 22. The voltage sensor 11 and the voltage drop determination circuit 12 are disposed in each core of the CPUs 0-3. The clock gate circuit 22 is disposed between the CLK control circuit 13 for generating and controlling the clock and clock distribution destinations (CPUs 0-3), and stops the clock (CPUCLK) of the CPUs 0-3 when the clock stop signal (CKSP) is inputted. The voltage sensor 11, the voltage drop determination circuit 12, and the clock control circuit 13 according to the second embodiment have the same configuration as in the first embodiment. However, the clock control circuit 13 according to the second embodiment can slow down the clock signal (CLK) by the clock stop signal (CKSP), but cannot slow down CPUCLK, which can be stopped.

Figure 29A:
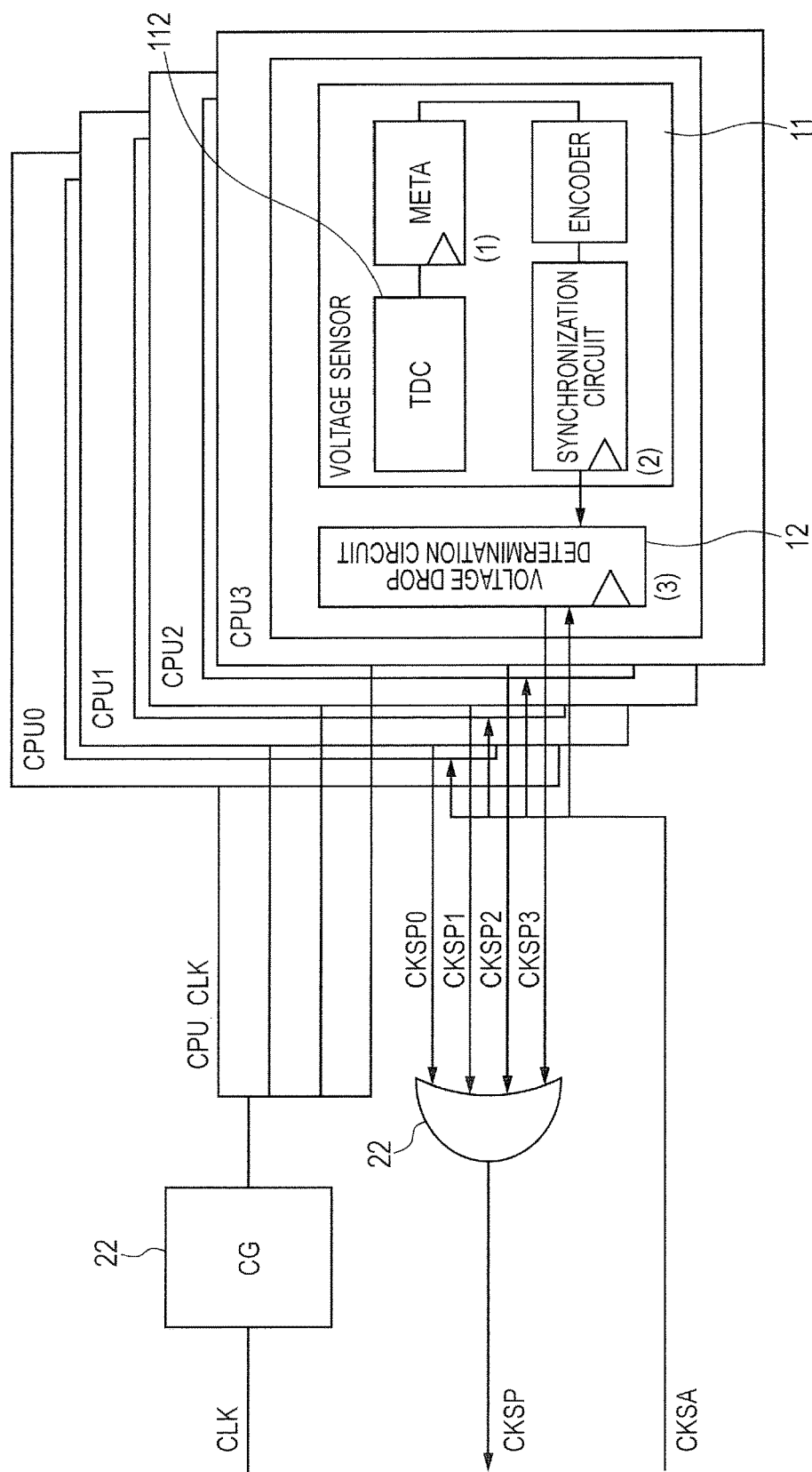
FIG. 29A is a block diagram showing the image of signal transfer between a quad-core CPU and the clock control circuit in FIG. 28.
Figure 29B:
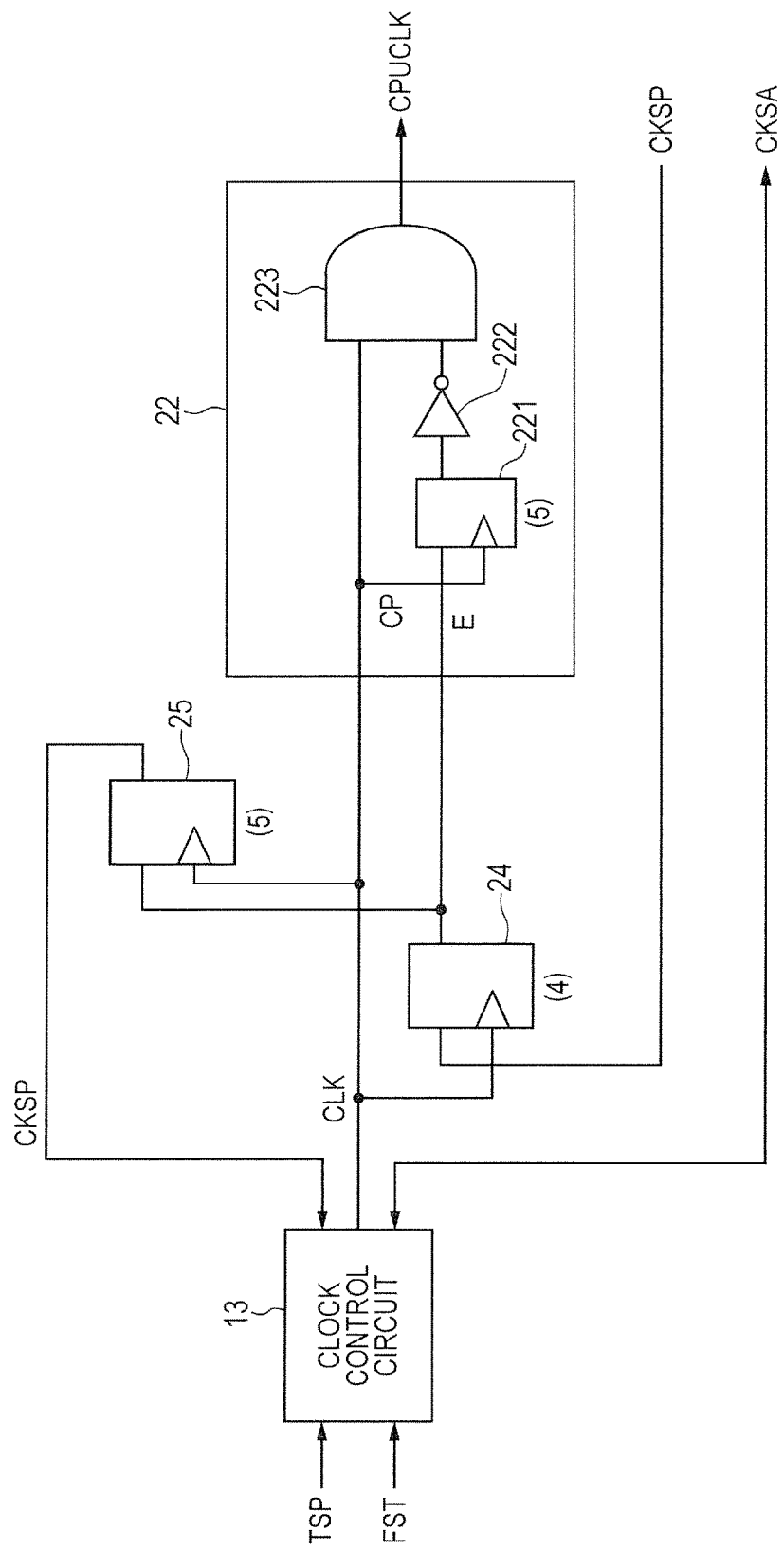
FIG. 29B is a block diagram showing the image of signal transfer between the quad-core CPU and the clock control circuit in FIG. 28.
Figure 30:
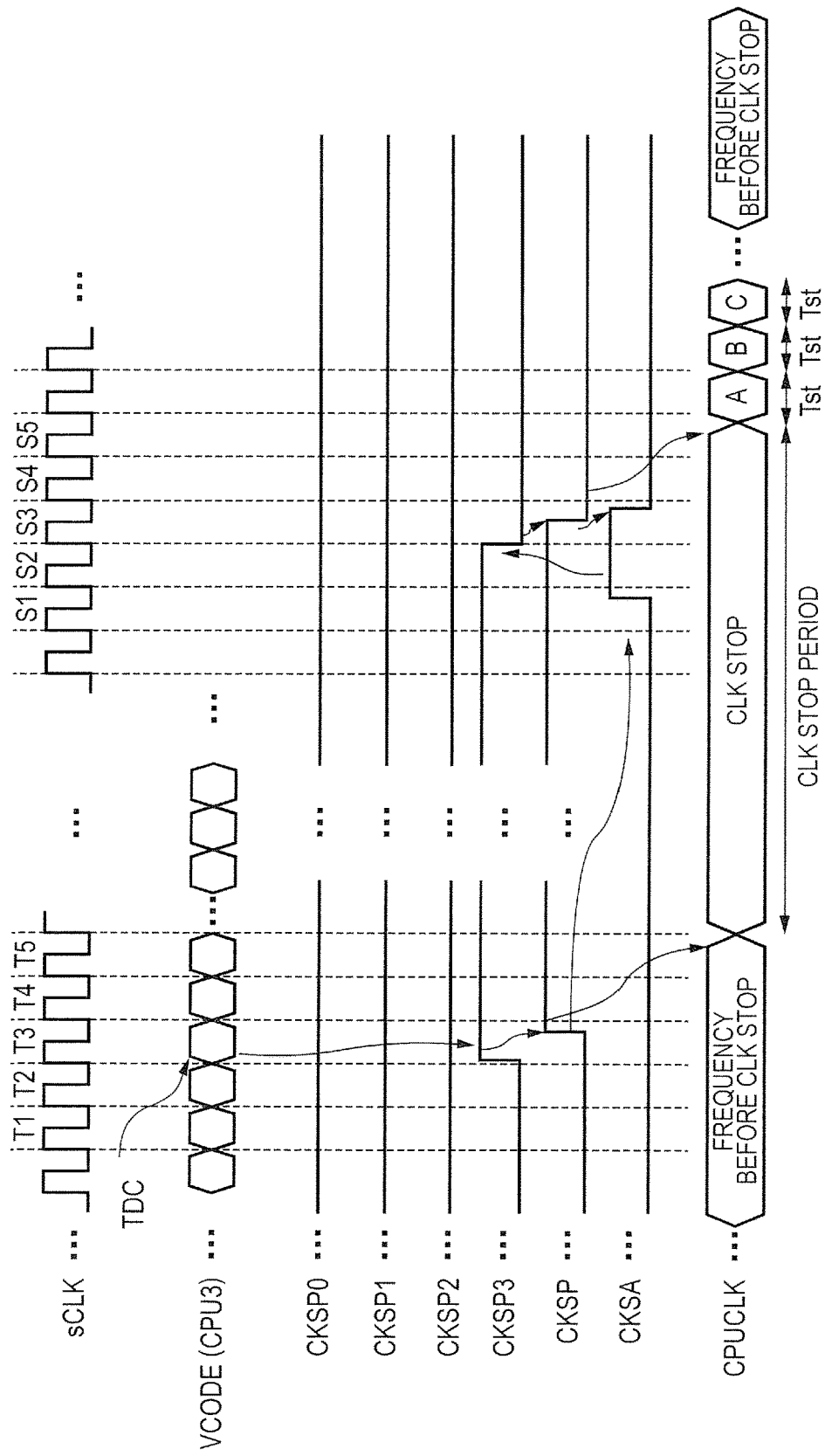
FIG. 30 is a clock stop operation waveform diagram of the quad-core CPU in FIG. 28.

FIGS. 29A and 29B are block diagrams showing the image of signal transfer between the quad-core CPU and the clock control circuit in FIG. 28. FIG. 30 is a diagram showing CLK stop operation waveforms of the quad-core CPU in FIG. 28. If the voltage drop determination circuit 12 determines, based on the voltage code (VCODE) of the voltage sensor 11 disposed in each CPU, that a fatal voltage drop occurs; the voltage drop determination circuit 12 outputs the clock stop signal (CKSP). Assume that when the clock stop signal becomes high, the clock stop control is asserted. After becoming high, the clock stop signal (CKSP) remains high, regardless of VCODE. Further, the clock stop signals (CKSP0-3) are inputted to an OR circuit 23 so that if the voltage drop determination circuit 12 in one of the four CPUs sets the clock stop signal (CKSP) to the high level, the clock stop control is executed. The clock stop signal (CKSP) as the OR result of the clock stop signals (CKSP0-3) is sent through a D flip-flop 24 as a synchronization circuit to the clock gate circuit 22, and sent through a D flip-flop 25 to the CLK control circuit 13. The clock gate circuit 22 includes a D flip-flop 221, an inverter 222, an AND circuit 223, and stops the clock in response to the clock stop signal (CKSP). After receiving the clock stop signal (CKSP), the CLK control circuit 13 waits for the clock stop period (TSP) set by the register value, and outputs the clock stop release signal (CKSA). In response to the clock stop release signal (CKSA), the voltage drop determination circuit 12 sets the clock stop signal (CKSP) to the low level to release the CLK stop. After the CLK stop is released, the CLK control circuit 13 returns the clock frequency to the frequency before the CLK stop, in a stepwise manner, based on the CLK restart step value (FST) set by the register value.

As shown in FIGS. 29A and 29B, due to only five synchronization circuits between the output of the TDC 112 and the output of the clock gate circuit 22, the latency from when the voltage sensor 11 detects a fatal voltage drop until the clock gate circuit 22 is as short as five clock cycles+CLK latency; accordingly, it is possible to stop the clock before the system malfunctions due to the voltage drop. Since the semiconductor device 20 uses the 1.5 GHz clock, five clock cycles=3.3 ns, which make it possible to stop the clock within about 5 ns.

As shown in FIG. 30, if the voltage drop determination circuit 12 of the CPU 3 determines, from the voltage code (VCODE) value outputted by the voltage sensor 11, that a fatal voltage drop occurs; the voltage drop determination circuit 12 sets the clock stop signal (CKSP3) to the high level (timing T3). Thereby, the clock stop signal (CKSP) as the output of the OR circuit 23 becomes the high level, which is captured by the D flip-flop 24 at timing T4, and captured by the D flip-flop 221 at timing T5, so that CPUCLK is fixed to the low level and stopped. Further, the clock stop signal (CKSP) is captured by the D flip-flop 25 at timing T5, and inputted to the CLK control circuit 13.

The CLK control circuit 13 stops the clock signal (CLK) (e.g., fixes CLK to the low level) for the clock stop period (TSP), and then sets the clock restart signal (CKSA) to the high level to output the clock signal (CLK). The clock restart signal (CKSA) is captured by the voltage drop determination circuit 12 at timing S1, and the clock stop signal (CKSP3) becomes the low level at timing S3. Thereby, the clock stop signal (CKSP) as the output of the OR circuit 23 becomes the low level, which is captured by the D flip-flop 24 at timing S4, and captured by the synchronization circuit 221 at timing S5, so that the clock signal (CLK) is outputted as CPUCLK. At this time, the clock signal (CLK) has a very low frequency (A). After the step time (Tst), the clock signal (CLK) having a frequency higher by Δf set by FST is outputted (B). Further, after the step time (Tst), the clock signal (CLK) having a frequency higher by Δf based on the clock restart step value (FST) is outputted (C). Thereafter, in the same way, the clock frequency is increased in a stepwise manner up to the frequency (fop) before the clock stop. It is preferable that the step time (Tst) be 100 ns or more.

While the invention made above by the present inventors has been described specifically based on the illustrated embodiments, the present invention is not limited thereto. It is needless to say that various changes and modifications can be made thereto.

What is claimed is:
1. A semiconductor device comprising:
   a voltage sensor which samples a power supply voltage at a speed faster than fluctuation in the power supply voltage, and encodes the power supply voltage into a voltage code value;
   a voltage drop determination circuit which detects a voltage drop based on the voltage code value; and
   a clock control circuit which generates a clock,
   wherein the clock control circuit comprises:
      a circuit which stops the clock when the voltage drop determination circuit detects the voltage drop, and stops the clock for a period from the clock stop until stabilization of power fluctuation; and
      a circuit which increases and returns, at the time of restarting the clock, a frequency of the clock in a stepwise manner up to a frequency before the clock stop,
   wherein the voltage drop determination circuit comprises
      a prediction computation circuit which looks ahead a voltage value from a history of the voltage code value and predicts a variation value, and wherein the prediction computation circuit comprises a circuit for masking a prediction value if a differential value of the prediction value is continuously negative for a predetermined number of cycles.

2. The semiconductor device according to claim 1, further comprising:

a register for setting the period for stopping the clock; and a register for setting a frequency for stepwise increase.

3. The semiconductor device according to claim 1, wherein the voltage drop determination circuit comprises:

a computation circuit which obtains a voltage value from the voltage code value; and a circuit which compares the voltage value obtained by the computation circuit with a predetermined voltage value set in a register and determines the voltage drop.

4. The semiconductor device according to claim 3, wherein the computation circuit comprises:

at least two of an absolute value computation circuit, an average value computation circuit, a variation value computation circuit, and a variation prediction value computation circuit; and a register for specifying a result of a computation circuit to be used among the computation circuits.

5. The semiconductor device according to claim 1, wherein the voltage sensor comprises:

a Time to Digital Converter (TDC) which receives an edge of a sampling clock as data input; and an encoder which encodes output of the TDC.

6. The semiconductor device according to claim 5, wherein the encoder performs encoding into voltage code on the lowest bit side in positions of change of data in a bit string of the TDC.

7. The semiconductor device according to claim 5, wherein a frequency of the sampling clock is more than 20 times faster than fluctuations in the power supply voltage and is 1/N of the frequency of the clock, where N is a natural number.

* * * * *